(12) United States Patent
Klassen

(10) Patent No.: US 6,508,535 B1
(45) Date of Patent: Jan. 21, 2003

(54) SYSTEMS AND METHODS FOR RANDOMIZED DOT SCHEDULING FOR MULTIPASS PRINTING

(75) Inventor: R. Victor Klassen, Webster, NY (US)

(73) Assignee: Xerox Corporation, Stamford, CT (US)

(*) Notice: Subject to any disclaimer, the term of this patent is extended or adjusted under 35 U.S.C. 154(b) by 56 days.

(21) Appl. No.: 10/046,193

(22) Filed: Jan. 16, 2002

(51) Int. Cl.[7] .............................. B41J 2/145; B41J 2/15
(52) U.S. Cl. ........................................................ 347/41
(58) Field of Search ............................. 347/43, 41, 14; 358/517

(56) References Cited

U.S. PATENT DOCUMENTS

| | | | |
|---|---|---|---|
| 4,748,453 A | | 5/1988 | Lin et al. |
| 4,965,593 A | | 10/1990 | Hickman |
| 6,019,454 A | * | 2/2000 | Serra et al. ................... 347/41 |
| 6,082,849 A | * | 7/2000 | Chang et al. ................. 347/43 |
| 6,179,407 B1 | | 1/2001 | Bockman |

OTHER PUBLICATIONS

T. G. Lewis et al., "Generalized Feedback Shift Register Pseudorandom Number Algorithm", Journal of the Association for Computing Machinery, vol. 20, No. 3, pp. 456–468, 1973.

* cited by examiner

Primary Examiner—Thinh Nguyen
(74) Attorney, Agent, or Firm—Oliff & Berridge, PLC

(57) ABSTRACT

For a swath of the image data, a start state of a random number generator is stored, and then a sufficient number of random numbers is generated such that each pixel has random number, or at least one bit of a random number, associated with it. The random number, or the portion of the random number, that is associated with a pixel determines during which pass that pixel is enabled for printing. To print a subsequent pass, the start state of the current swath is reset and the random numbers for the current swath are regenerated. To determine during which pass a pixel is enabled, the associated random number is combined with a different mask and/or complemented, or is compared to a different criterion, for each pass.

40 Claims, 17 Drawing Sheets

SYSTEMS AND METHODS FOR RANDOMIZED DOT SCHEDULING FOR MULTIPASS PRINTING

BACKGROUND OF THE INVENTION

1. Field of the Invention

This invention is directed to systems and methods for multipass fluid ejection systems.

2. Description of the Related Art

The popularity of computer printers has fueled development of more efficient and quiet printers that generate high quality images in both black/white and color formats.

Multipass liquid inkjet printers form images by sweeping a print head apparatus over a substrate and ejecting a series of liquid ink droplets onto the receiving substrate and advancing the substrate as necessary. The process by which the print head apparatus is swept across the receiving substrate, the ejection of a series of liquid ink droplets, and the advancement of the receiving substrate comprise a multiple pass (or multipass) routine.

Meeting the increasing demand for speed and higher quality, photo-like, full color imaging has created the need for a system that operates within the entire spectrum. In this regard, a system should be capable of transferring a large amount of liquid ink onto a receiving substrate. By placing a large amount of liquid ink onto a receiving substrate, especially when contrasting colored ink droplets are placed adjacent to each other, may result in cockling of the paper, beading, undesirable color coalescence or other observable artifacts.

Although inkjet printers may initially produce very high quality images, the droplet size and placement accuracy may worsen with time due to mechanical and electrical fatigue factors associated with the print head nozzles of such printers. Furthermore, such nozzle fatigue factors generally manifest in pattern-like printing errors that are quite noticeable to a user, particularly when the printing mode is a single-pass printing mode.

Accordingly, as shown in FIGS. 1, 2, 3 and 4A–4C, in the prior art systems, which printed a particular pixel element in a non-randomized, repeated sequence, noticeable pattern-like printing errors commonly occur. FIG. 1 illustrates one conventional fluid ejection apparatus 10 usable for depositing fluid droplets on a receiving substrate. As shown in FIG. 1, the conventional fluid ejection apparatus includes a carriage 12 movable along the direction A upon one or more guide rails 14 and 16. The carriage 12 may include a single fluid cartridge 26 or multiple fluid ink cartridges 26B, 26M, 26C and 26Y, containing one or more different types of fluids.

FIG. 2 illustrates a conventional fluid head ejection cartridge. As shown in FIG. 2, droplets of the fluid are ejected from nozzles 32 which are usually linearly arranged in a nozzle face of the fluid cartridge 26. It is well known in the art that the quality of the placement of the fluid drops on the receiving substrate is affected by the ability of the receiving substrate to absorb the fluid and/or the performance of nozzles in applying the fluid to the receiving substrate.

In generating a pattern of fluid drops on the receiving substrate, the fluid is desirably applied to only those areas on the receiving substrate corresponding to the pattern being reproduced, and not leaving any areas, which the fluid is to be applied, without the fluid. It is well known, when the fluid is one or more differently colored inks, to deposit the ink onto the receiving substrate such that the drops of ink, corresponding to one or more colors or one or more color combinations, overlap.

It is well known in the art to eject the fluid drops forming the desired pattern one swath at a time by passing the fluid ejection cartridge over the same area the receiving substrate multiple times. A swath is typically defined as the width of the array of nozzles 32 in the direction orthogonal to the fast scan direction A, i.e., the process direction B. During each pass over a particular swath, drops of the fluid are ejected only for certain pattern portions of the pattern. It is also known in the art to advance the receiving substrate 28 relative to the fluid cartridge 26 by a partial swath in the process direction B between passes when printing a single swath of the desired pattern.

FIG. 3 illustrates a conventional technique for ejecting fluid onto a receiving substrate. As shown in FIG. 3, the conventional technique for ejecting fluid onto a receiving substrate may be used to avoid uninked portions occurring between the ink drops. More specifically, the conventional technique for ejecting fluid onto a receiving substrate may be used, for example, to avoid uninked white portions, if the recording substrate is white, occurring between the ink drops.

However, overlapping fluid drops is known to cause beading. Beading is an undesirable condition that occurs when overlapping drops of adjacent pattern areas, such as pixels in an image, are deposited when the fluid is still free to flow. When adjacent fluid drops spread over the surface of the receiving substrate, fluid from one drop will overlap and form into the portion occupied by the fluid of another drop. As a result, the density of the pattern image may appear non-uniform because of the differing areas of high and low amounts of fluid that result from the beading.

Conventionally, as shown in FIGS. 4A–4C, the fluid drops are applied in an alternate checkerboard to avoid beading on the receiving substrate. For example, if two passes are made, ½ of the fluid drops are printed in a checkerboard pattern on each pass. That is, the checkerboard pattern is overlaid on the pattern of fluid drops to divide the pattern portions into two sets. Fluid drops, corresponding to the first set of portions of the pattern portions, are ejected on the first pass, as shown in FIG. 4A. Then, the remaining pattern portions, corresponding to the second set of portions of the pattern portions, receive fluid drops, as shown in FIG. 4B.

Then, as shown in FIG. 4C, for a third pass of the two-pass mode, the pattern repeats. Specifically, the third pass begins with the checkerboard pattern overlaid on the pattern of fluid drops for the second swath of image data and the data is divided into another set of two portions. The fluid drops, corresponding to the first set of portions, are ejected on the first pass of the second swath, as shown in FIG. 4C. However, problems may still arise that affect the pattern quality of the ejected fluid drops, if there are failures in the performance of the nozzles of the fluid ejection cartridges 26.

To improve print quality, multiple passes are typically used in ink jet printing. In a two-pass mode, pixels corresponding to one color of a checkerboard pattern are printed on the first pass, and the remaining pixels on the second pass. For example, U.S. Pat. No. 4,748,453 to Lin et al., incorporated herein in its entirety, depicts an example of a two-pass mode system in FIGS. 1–4.

In operation, a multiple pass mode system of N passes prints a fraction 1/N of the pixels on each pass. In this fraction, the deposited ink has time to dry between passes, and is less likely to cause mottling or many of the other undesirable artifacts common to draft mode ink jet printing. Commonly, the print head is advanced a partial swath between passes. This allows another nozzle or series of nozzles to fire and eject ink resulting in a partial printed swath. Because a plurality of nozzles are used to print on a given scanline, defects in any one nozzle are less visible. As commonly practiced in the art, in an N-pass mode, the pixels printed on a given pass are specified by one of a fixed set of regular patterns.

SUMMARY OF THE INVENTION

This invention provides systems and methods that eject fluid in patterns that improve the quality of a printed image.

This invention separately provides systems and methods that eject fluid for a swath in a random or pseudo-random manner relative to other swaths.

In various exemplary embodiments of the systems and methods according to this invention, image data is input and associated with corresponding pixel elements for a particular swath of print data in an N-pass mode multipass system. A plurality of random numbers Q are generated within a particular range R of possible numbers. Each random number is associated with one or more pixels to be printed in the current swath for all of the passes used to completely print the image data for those pixels.

As a first pass for a particular set of pixels is begun, a start state of a random number generator is saved. Before each subsequent pass for that particular set of pixels is begun, the state of the random number generator is reset to the saved start state. As a result, the same random numbers will be generated for that particular set of pixels for each of the N passes used to completely print that set of pixels. The random number associated with each set of one or more pixels controls which pixels of that set are enabled in each pass, i.e., which pass a particular pixel will be printed in.

These and other features and advantages of the invention are described in or apparent from the following detailed description of the preferred embodiment.

BRIEF DESCRIPTION OF THE DRAWINGS

The invention will be described in conjunction with the following drawings in which like reference numerals designate like elements and wherein.

DETAILED DESCRIPTION OF EXEMPLARY EMBODIMENTS

The following detailed description of various exemplary embodiments of the fluid ejection systems according to this invention are directed to one specific type of fluid ejection system, an ink jet printer. An ink jet printer is discussed for sake of clarity and familiarity. However, it should be appreciated that the principles of this invention, as outlined above and/or discussed below, can be equally applied to any known or later-developed fluid ejection systems and is not limited to the ink jet printer specifically discussed herein.

In operation, a conventional multiple pass mode system of N passes prints a fraction 1/N of the pixels on each pass. In this fraction, the deposited ink has time to dry between passes, and is less likely to cause mottling or many of the other undesirable artifacts common to draft mode ink jet printing. Commonly, the print head is advanced a partial swath between passes. This allows another nozzle or series of nozzles to fire and eject ink resulting in a partial printed swath. Because a plurality of nozzles are used to print on a given scanline, defects in any one nozzle are less visible. As commonly practiced in the art, in an N-pass mode, the pixels printed on a given pass are specified by one of a fixed set of regular patterns.

In this regard, additional attempts have been made to further control depositing liquid ink by using a mask to reduce the undesirable overlap of adjacent ink droplets. Although using masks has reduced the undesirable overlap and adjacent liquid ink droplet coalescent problems, multipass liquid ink ejection systems present additional challenges. Each subsequent swath of ink drops deposited along a receiving substrate, may use, for example, a particular mask. This mask may be, for example, 4×4 pixels in size. However, repetitively using a particular mask may itself create undesirable observable artifacts in the image formed on the receiving substrate. Due to the nature of the human visual system, any regularly repeating artifact caused by a defect in the print head is more visible than an irregularly repeating artifact.

Figure 1:
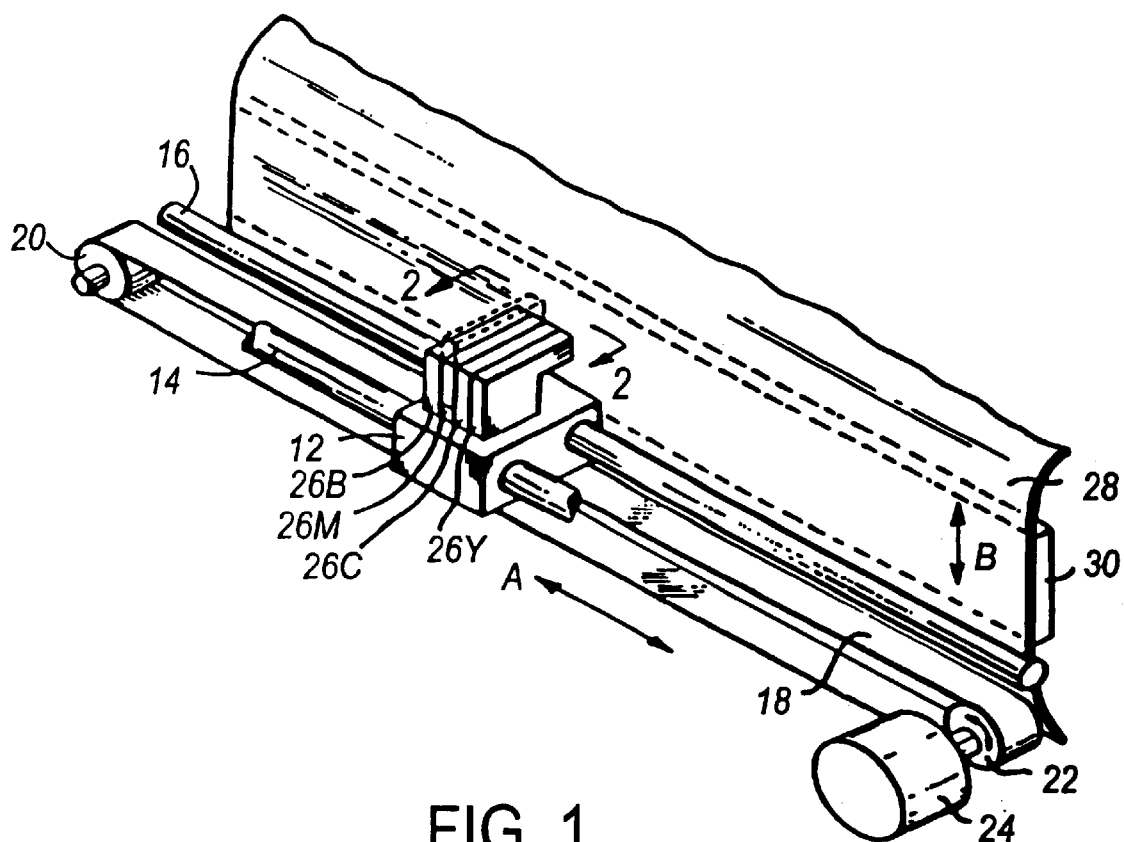
FIG. 1 illustrates a conventional multihead fluid ejection apparatus.
Figure 2:
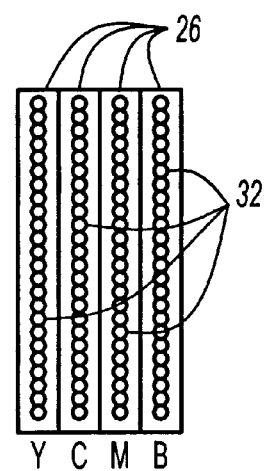
FIG. 2 illustrates a conventional fluid head ejection cartridge.
Figure 3:
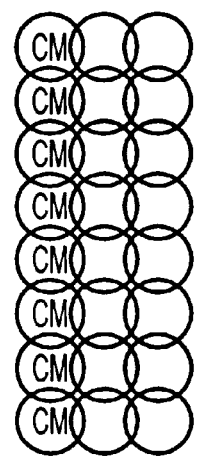
FIG. 3 illustrates a conventional technique for ejecting fluid onto a receive substrate.
Figure 4A:
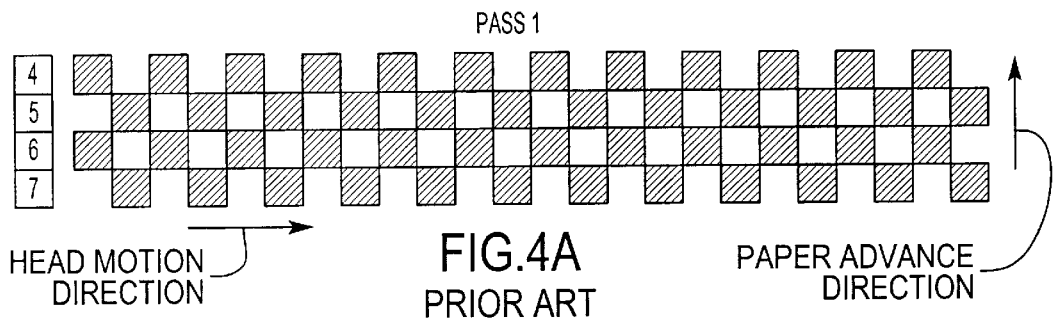
FIGS. 4A–4C illustrate a conventional technique for ejecting fluid onto the receiving substrate in multiple passes.
Figure 4B:
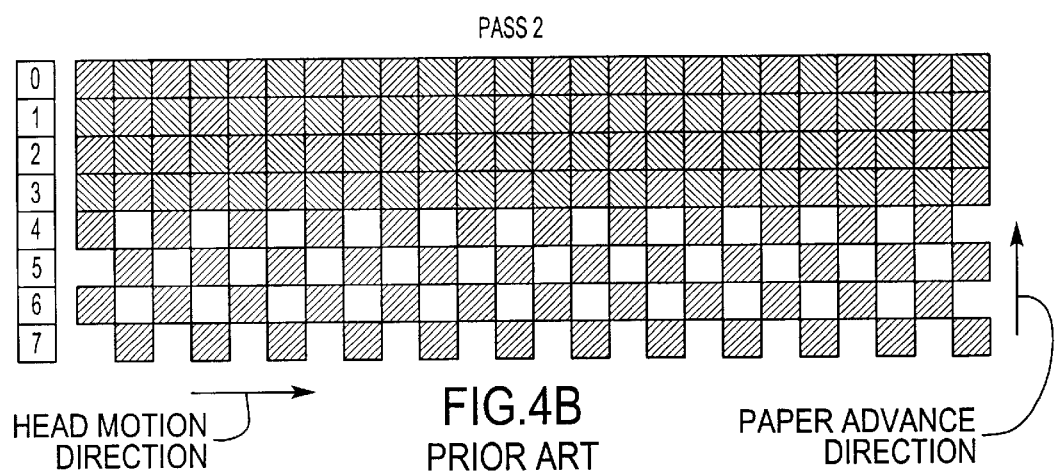
Figure 4C:
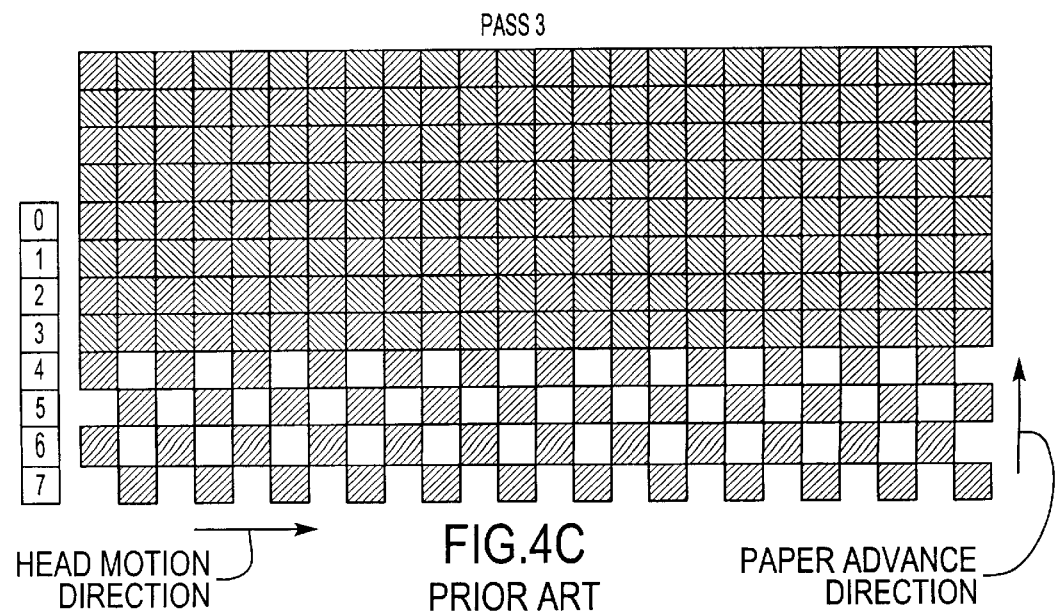
Figure 5A:
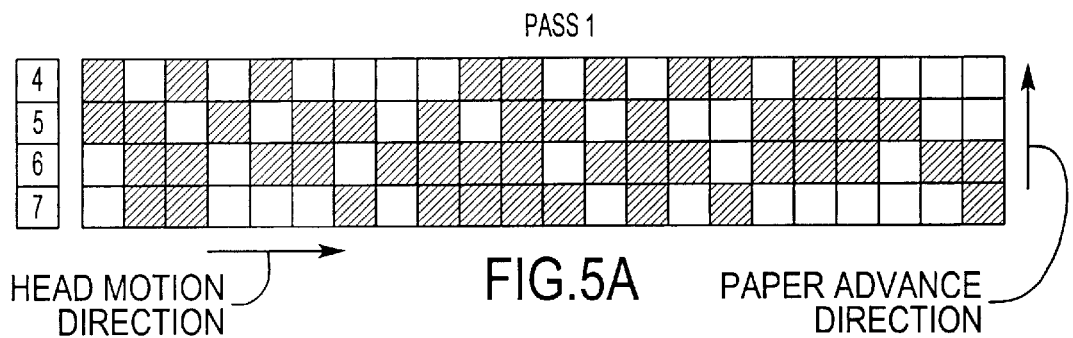
FIGS. 5A–5C illustrate one exemplary embodiment of a method for ejecting fluid onto the receiving substrate in multiple passes according to this invention.
Figure 5B:
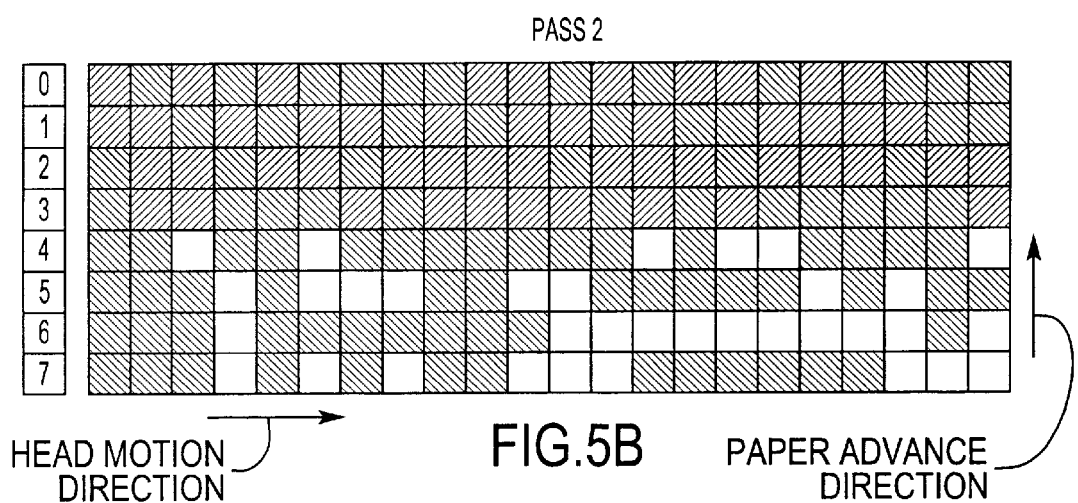
Figure 5C:
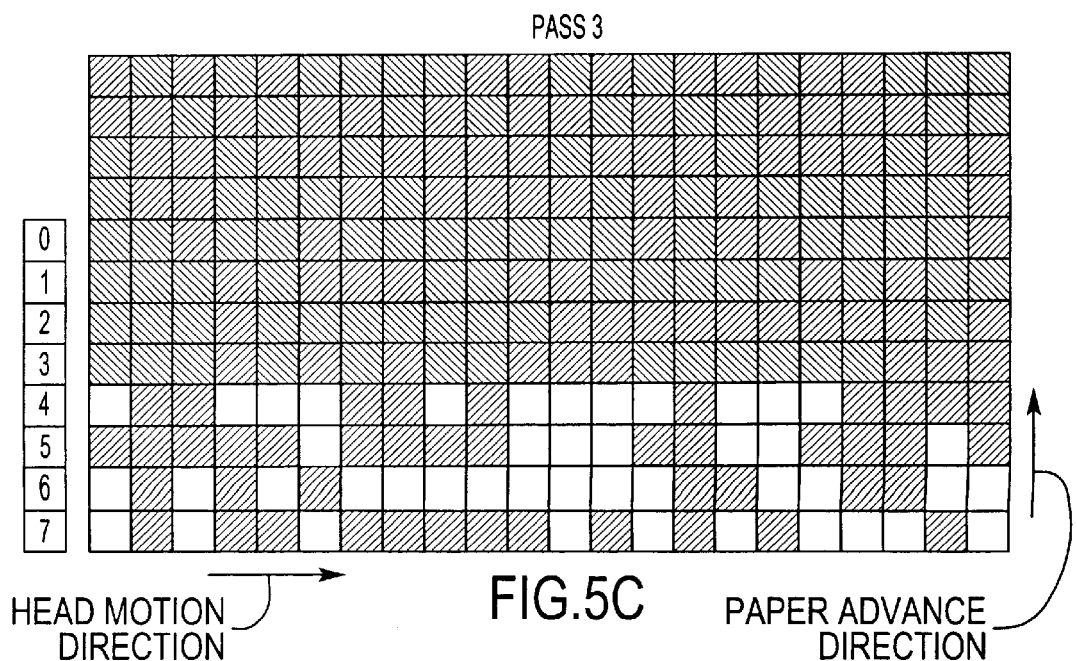

FIGS. 5A–5C illustrate one exemplary embodiment of a method for ejecting fluid onto a receiving substrate in multiple passes according to this invention. For example, if N is the number of passes to be used to completely print each swath, then, in a 3-pass mode, N is equal to 3. Accordingly, for a 3-pass mode, a printed swath must be resolved in three passes. FIGS. 5A–5C illustrate a two-pass mode using an eight-nozzle printhead.

As shown in FIG. 5A, for a first pass in a 2-pass mode, the receiving substrate advances until at least the lower half, i.e., the nozzles 4–7, of the printhead is aligned for printing onto the receiving substrate. The random number generator associates each pixel of a first swath with a different first random number. Thus, each pixel is enabled for printing based on the value of that associated first random number during the first pass.

Then, as shown in FIG. 5B, the receiving substrate is advanced by one-half of the length of the array of nozzles of the printhead. At the same time, the random numbers associated with the pixels of the first swath printed by the lower-half nozzles, i.e., the nozzles 4–7, during the first pass, are regenerated and associated with those same pixels of the first swath, which are now to be printed with the upper-half nozzles, i.e., the nozzles 0–3, during the second pass. In particular, the regenerated random numbers are associated with those same pixels of the first swath such that the particular pixels enabled by the associated random numbers on the first pass are not enabled during the second pass, and the pixels that were not enabled during the first pass are enabled during the second pass.

At the same time, the random number generator associates a new, second random number, that is different than the first random number, with each pixel of a next swath to be printed using the lower-half nozzles 4–7 during a first pass for the next swath. Then, the second pass of the first swath is printed using the upper-half nozzles 0–3 while the first pass of the second swath is printed using the lower half nozzles 4–7 based on the print data for each swath and the random numbers associated with each swath.

Then, as shown in FIG. 5C, the receiving substrate is advanced by another one-half of the length of the array of nozzles of the printhead. At the same time, the random numbers associated with the pixels of the second swath printed by the lower-half nozzles, i.e., the nozzles 4–7, during the first pass of the second swath, are regenerated and associated with those same pixels of the second swath, which are now to be printed with the upper-half nozzles, i.e., the nozzles 0–3, during the second pass of the second swath. In particular, the regenerated random numbers are associated with those same pixels of the second swath such that the particular pixels enabled by the associated random numbers on the first pass are not enabled during the second pass and the pixels that were not enabled during the first pass are enabled during the second pass.

At the same time, the random number generator associates a new, third random number with each pixel of a next swath to be printed using the lower-half nozzles 4–7 during a first pass for the next swath. Then, the second pass of the second swath is printed using the upper-half nozzles 0–3 while the first pass of the third swath is printed using the lower half nozzles 4–7 based on the print data for each swath and the random numbers associated with each swath.

By determining randomly which pixels are enabled for each pass of any particular swath of image data, an observable pattern in the output image resulting from continuously reusing a mask pattern is reduced, and, ideally, prevented.

Figure 6:
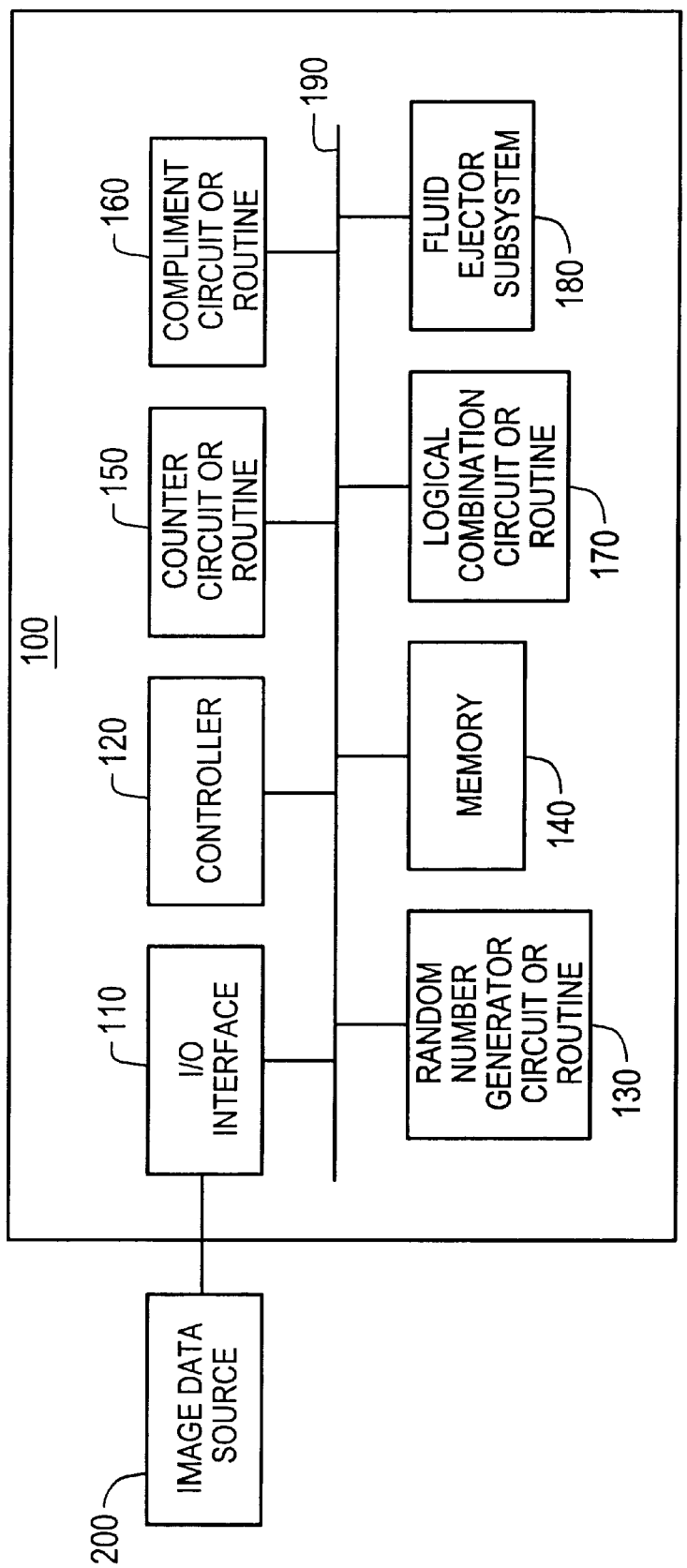
FIG. 6 is a block diagram of one exemplary embodiment of a fluid ejection system according to this invention.

FIG. 6 is a block diagram of one exemplary embodiment of a fluid ejection system 100 according to this invention. As shown in FIG. 6, the fluid ejection system 100 includes an input/output interface 110, a controller 120, a random number generator circuit or routine 130, a memory 140, a counter circuit or routine 150, a complement circuit or routine 160, a logical combining circuit or routine 170, and a fluid ejector subsystem 180, interconnected by a data and/or control bus 190. The input/output interface 110 may include any known or later-developed interface usable to input image data into the fluid ejection system 100 from an image data source 200. The image data input from the image data source through the input/output interface 110 is stored, under control of the controller 120, into the memory 140.

The random number generator circuit or routine 130 generates a single random number or a portion of a random number for each individual pixel of a swath of the input image data received from the image data source 200. The counter circuit or routine 150 keeps track of a current pass number n for an N-mode multipass system. In various exemplary embodiments, the counter circuit 150 also keeps track of how many m x-bit portions are included in a particular scanline. In general, the counter circuit or routine 150 keeps track of the image data corresponding to individual pixels, individual m x-bit portions of a particular scanline which correspond to individual passes, and/or the individual passes of a particular swath of image data.

In various exemplary embodiments, the complement circuit or routine 160 and/or the logical combining circuit or routine 170 cooperate with the random number generator 130 to enable the individual pixels for each pass. In various exemplary embodiments in an N-mode system, the complements of the random numbers and/or a set of one or more masks associated with a particular one of the n passes, are generated and/or selected by the complement circuit or routine 160 and combined by the logical addition circuit or routine 170 with the individual random numbers Q and/or with the image data for the current swath to enable a unique set of the pixels of the current swath for the nth pass. For example, in a two-pass system, the complement circuit or routine 160 can generate a complement of the random numbers for the current swath used in the first pass to generate the random numbers for the second pass. Then, the logic circuit or routine 170 logically combines the complemented random numbers for the current swath with the image data for the current swath to generate the print data for the second pass of the current swath. Previously, the logic combination circuit or routine 170 will have combined the image data of the current swath with the random numbers for the current swath to generate the print data for the first pass.

For a three-pass or greater system, the compliment circuit or routine 160 may generate a complement of the random number and will generate or select an nth mask for the image data based on the nth pass that is to be printed. The logic combining circuit or routine 170 will logically combine the random number or its complement, the nth mask and the image data for the current swath to generate the print data for the nth pass of the current swath.

Figure 7:
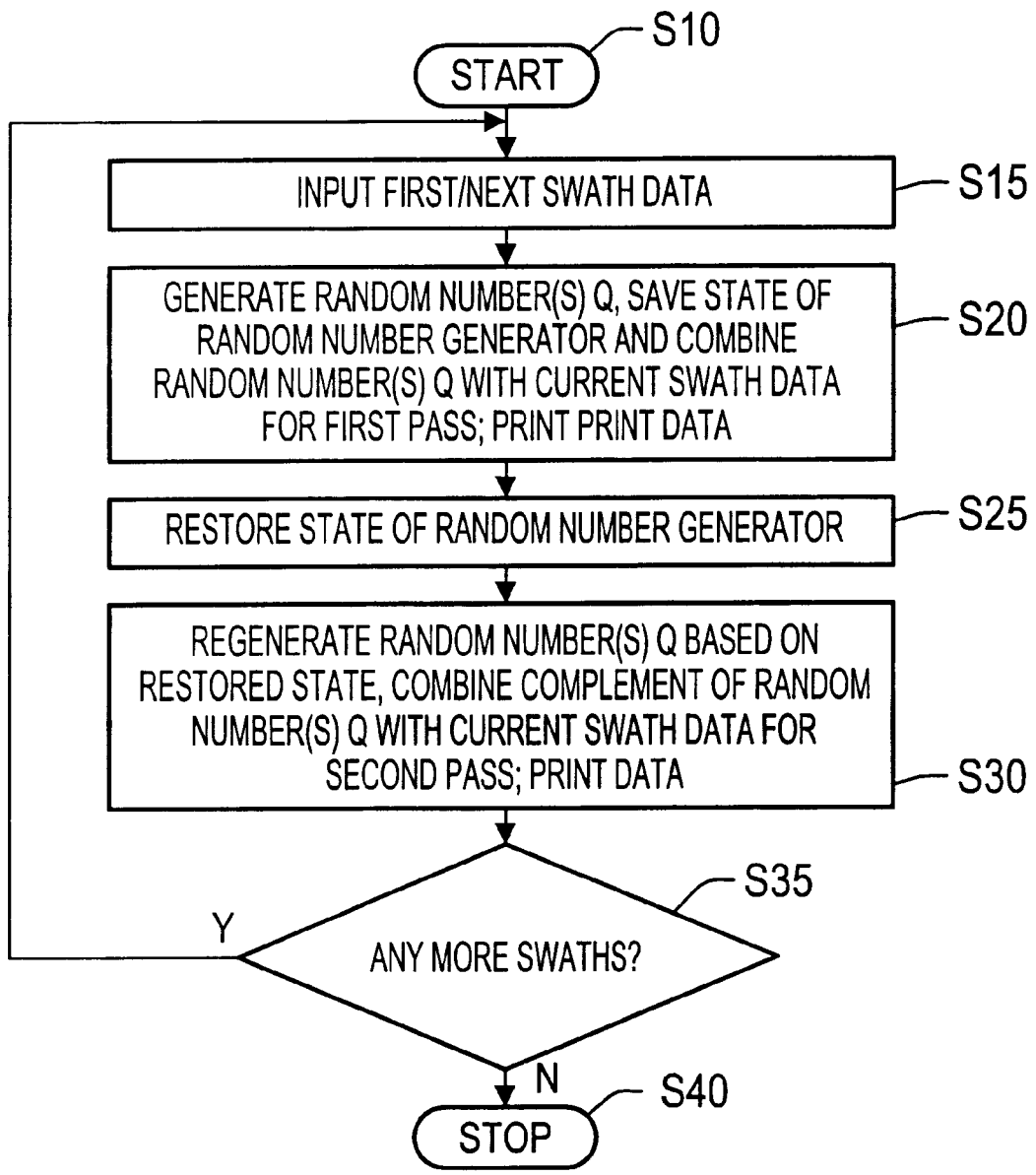
FIG. 7 is a flowchart outlining a generalized two-pass method of operation according to this invention.

FIG. 7 is a flowchart outlining one exemplary embodiment of a method for random two-pass fluid ejection according to this invention. As shown in FIG. 7, operation of the method begins in step S10 and continues to step S15, where a first or next swath of print data is input.

Then, in step S20, a random number Q within a range R is generated for each of a plurality of portions of the current swath. It should be appreciated that, in various exemplary embodiments, a different random number is associated with each pixel in the current swath. In this case, R can be any desired range. In various other exemplary embodiments, each pixel of the current swath is associated with one bit of a q-bit random number. In this case, R is within the range 0 to $2^q-1$. In this case, the current swath is divided into m portions of q pixels. Then, m q-bit random numbers are generated for the current swath. Because a conventional random number generator can efficiently generate 32-bit random numbers, in various exemplary embodiments, q can be 32. However, Q can be any desired length, q.

Also, in step S20, the start state of the random number generator, i.e., the state of the random number generator just before or during generation of the first random number for the current swath, is saved. Additionally, in step S20, the random numbers for the current swath are each compared to the midpoint of the range R to enable a corresponding portion of the image data for the current swath, or are logically combined with the corresponding one or more pixels, to generate a corresponding portion of print data. The generated print data is then gathered and temporarily held until all of the portions of the print data for the first pass of the current swath are generated. In step S20, when all the print data for the current swath has been generated, the first pass commences and the first pass print data is printed.

Although FIG. 7 shows all of these activities as happening within step S20, the activities do not all have to take place in a single step. These activities may occur, for example, in individual or separate steps. Similarly, the individual activities in step S20 may, for example, be grouped together, either in total or in part.

Combining or associating the random numbers with the image data for the current swath will create a randomly arranged pixel-printing scheme. Then, in step S25, the start state for the random numbers for the current swath of image data is restored. As a result, because the start state of the random number generator is restored, the same random numbers generated in step S20 for the first pass of the current swath of image data are generated in step S30 for the second pass of the current swath of image data. Next, in step S30, the generated random numbers are "complemented" to generate the complements of the generated random numbers. In particular, the random numbers can be complemented by taking the logical complement or by comparing the random number to the mid point of the range R in the opposite sense to the earlier comparison.

Then, in step S30, the complements of the generated random numbers are "combined" with the pixels of the current swath to generate the print data for the second pass. As a result, the pixels enabled during the first pass are not enabled during the second pass. Likewise, the pixels disabled during the first pass are enabled during the second pass. The print data for the second pass is then gathered and temporarily held until all of the portions of the print data for the second pass of the current swath are generated. When all the print data for the second pass has been generated, the second pass commences and the second-pass print data is printed. Operation then continues to step S35.

Like step S20, although FIG. 7 outlines all of these activities happening in step S30, these activities do not have to take place in a single step. These activities may occur, for example, in individual separate steps. Similarly, the individual activities contained in step S30 may, for example, be grouped together in different groups.

In step S35, a determination is made whether there are any more swaths to be printed. If so, operation returns to step S20. Otherwise, operation continues to step S40, where the operation of the method ends.

Figure 8:
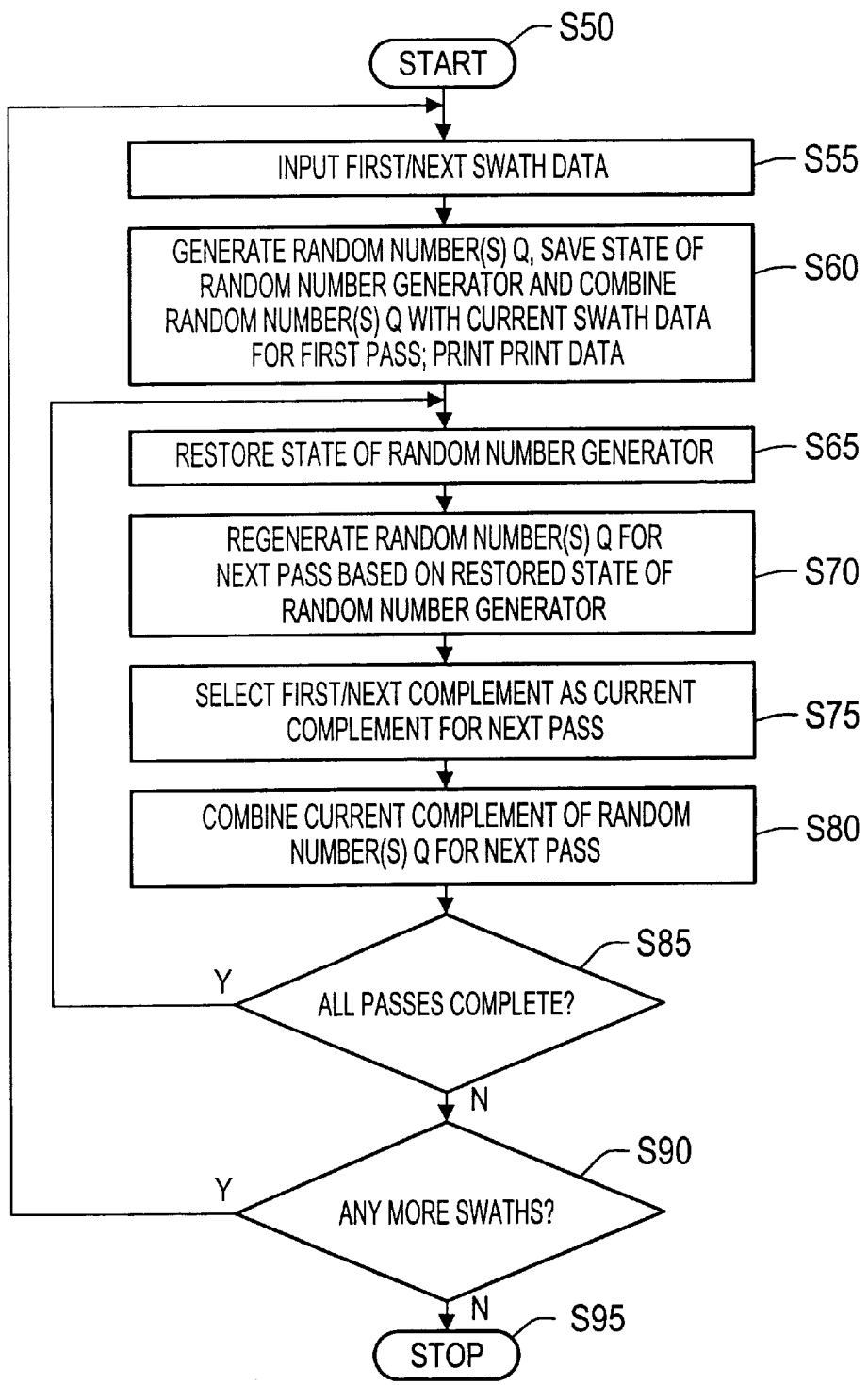
FIG. 8 is a flowchart outlining a generalized N-pass method of operation according to this invention.

FIG. 8 is a flowchart outlining one exemplary embodiment of a method for random N-pass printing according to this invention. As shown in FIG. 8, operation of the method begins in step S50 and continues to step S55, where image data for a first or next swath is input.

Then, in step S60, a random number Q within a range R is generated for each of a plurality of portions of the current swath. It should be appreciated that, in various exemplary embodiments, a different random number is associated with each pixel in the current swath. In this case, R can be any desired range. In various other exemplary embodiments, each pixel of the current swath is associated with one bit of a q-bit random number. In this case, R is within the range 0 to $2^q-1$. In this case, the current swath is divided into m portions of q pixels. Then, m q-bit random numbers are generated for the current swath. Because a conventional random number generator can efficiently generate 32-bit random numbers, in various exemplary embodiments, q can be 32. However, Q can be any desired length, q.

Also, in swath S60, the start state of the random number generator, i.e., the state of the random number generator just before or during generation of the first random number for the current swath, is saved. Additionally, in step S60, the random numbers for the current swath are each compared to an nth portion of the range R to enable a corresponding portion of the image data for the current swath or are logically combined with one or more pixels and one or more masks associated with the nth portion to generate a corresponding portion of print data. The generated print data is then gathered and temporarily held until all of the portions of the print data for the first pass of the current swath are generated. In step S20, when all the print data for the current swath has been generated, the first pass commences and the first pass print data is printed.

Although FIG. 8 shows all of these activities happening with step S60, the activities do not all have to take place in a single step. These activities may occur, for example, in individual and separate steps. Similarly, the individual activities in step S60 may be grouped together, for example, either in total or in part.

Combining or associating the random numbers with the image data for the current swath, will create a randomly arranged pixel-printing scheme. Next, in step S60, the start state for the random number generator is restored. As a result, because the start state of the random number generator is restored, the same random numbers regenerated in step S60 for the first pass of the current swath of image data are regenerated in step S70 for the second pass of the current swath of image data. Then, in step S75, a "complement" or a "mask" that enables certain pixels of the current swath for the next pass is selected. This "complement" could be selected by selecting a 1/N portion of the range R that is enabled for the next pass and comparing the random numbers Q to that selected 1/N portion. Alternatively, the "complement" or "mask" could be a logical complement of the random numbers, or a selected mask to be logically combined with the random numbers, or both.

Then, in step S80, the "complement" or the "mask" of the random numbers for the current swath is used with the image data of the current swath to generate the print data for the next pass. As a result, the pixels enabled in the previous pass or passes are not enabled in the next pass while at least some of the pixels that were not previously enabled in the previous pass(es) are enabled for the next pass.

In step S85, a determination is made whether there are any more passes to be printed. If so, operation returns to step S65. Otherwise, operation continues to step S90. In step S90, a determination is made whether there are any more swaths of image data to be processed. If so, operation returns to step S55. Otherwise, operation continues to step S95, where operation of the method ends.

Figure 9A:
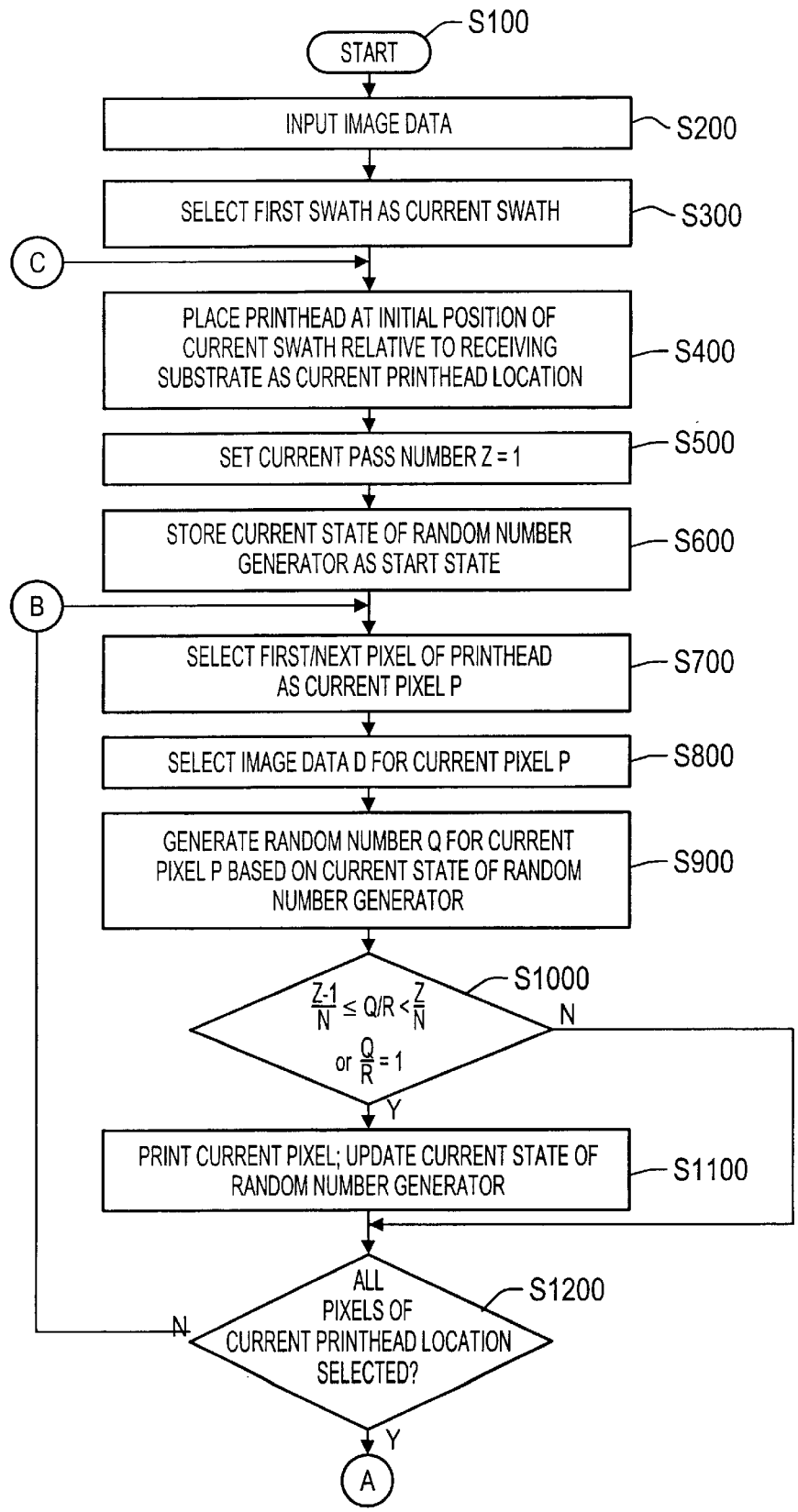
FIGS. 9A and 9B are a flowchart outlining a first exemplary embodiment of a method for random multipass fluid ejection according to this invention.
Figure 9B:
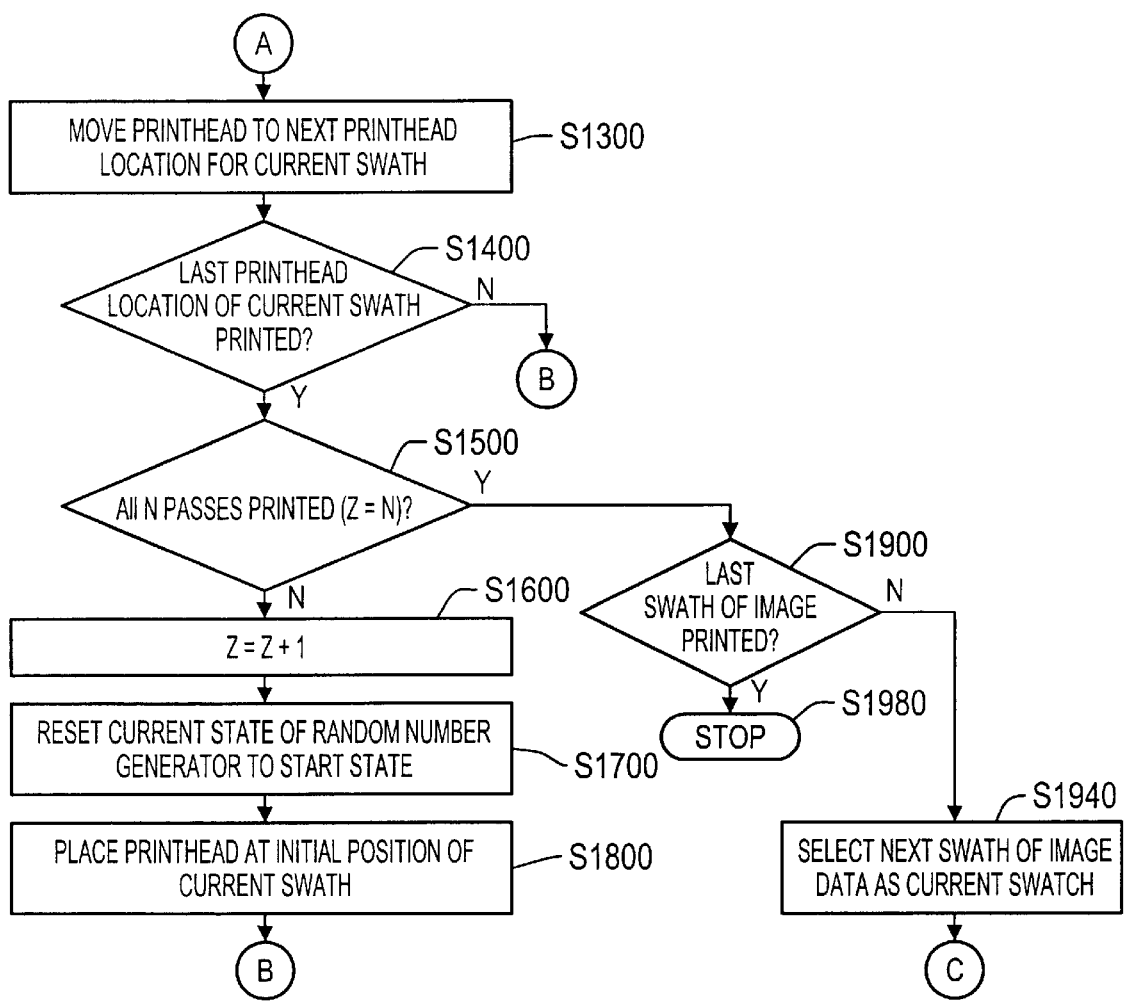

FIGS. 9A and 9B are a flowchart outlining a first exemplary embodiment of a method for random multipass fluid ejection according to this invention. As shown in FIG. 9A, operation begins in step S100 and continues to step S200, where image data for a first swath is input. Then, in step S300, the first image data swath is selected as the current swath. Next, in step S400, the print head is placed at an initial position for the current swath relative to the receiving substrate as the current print head location. Operation then continues to step S500.

In step S500, the current pass number Z is set equal to 1. Next, in step S600, the state of the random number generator is saved as the start state of the random number generator for subsequent passes. Then, in step S700, the first pixel of the print head is selected as the current pixel P. Operation then continues to step S800.

In step S800, the particular image data D for the current pixel P is selected or input. Then, in step S900, a random number Q is generated based on the current state of the random number generator, the state of the random number generator is updated, and the generated random number Q is associated with the current pixel P. Next, in step S1000, a determination is made whether the random number Q associated with the current pixel P lies within a 1/N portion of the range R of the random numbers generated by the random number generator that corresponds to the current pass Z, where N is the total number of passes needed to complete a single swath. That is, a pixel is enabled when the pass number Z for the current pass is equivalent to the greatest integer that is not greater than the quotient QN/R for the random number Q associated with that pixel. In other words, that pixel is enabled when:

$$Z = \left\lfloor \frac{QN}{R} \right\rfloor, \quad (1)$$

where:

Z is the current pass number, where Z ranges from 0 to N−1, with the first pass numbered 0;

N is the total number of passes;

Q is the current random number; and

R is the range of the random numbers.

Of course, if the random numbers range from $R_{min}$ to $R_{max}$, where $0 \neq R_{min} < R_{max}$, $R_{min}$ is the minimum random number, and $R_{max}$ is the maximum random number, then Q can be normalized by subtracting $R_{min}$ from Q before plugging the normalized Q into Eq. (1). Additionally, it should be appreciated that, for a two-pass mode, i.e., N=2, the decision implemented using Eq. (1) can be simplified to Q≦R/2 for the first pass and Q>R/2 for the second pass, or vice versa.

If the condition defined in Eq. (1) is met, operation then continues to step S1100. Otherwise, operation jumps directly to step S1200. In step S1100, the current pixel is designated as an enabled pixel. That is, an enabled pixel is a pixel that will be printed during the current pass based on the value of the image data associated with that pixel. Otherwise, the current pixel is disabled. In this case, the current pixel either was printed based on the value of its image data during a previous pass or will be so printed during a later pass for the current swath. Operation then continues to step S1200, where a determination is made whether all of the pixels of a current print head location have been selected. If all pixels of a current print head location have not been selected, operation returns to step S700. Otherwise, operation continues to step S1300.

In step S1300, the print head is moved to the next print head location for the current swath. Next, in step S1400, a determination is made whether the last print head location of the current swath has been printed. If so, operation continues to step S1500. Otherwise, if the last print head location of a current swath has not been printed, operation again returns to step S700. It should be appreciated that, in various exemplary embodiments, step S1400 could be performed before step S1300. In this case, if the last printhead location has not been printed, operation continues from step S1400 to step S1300 before returning to step S700.

In step S1500, determination is made whether all N passes have been printed. If so, operation continues to step S1900. Otherwise, operation continues to step S1600. In step S1600, the current pass number Z is incremented by one. Next, in step S1700 the current state of the random number generator is reset to the start state. Then, in step S1800, the print head is again placed at the initial position for the current swath. Operation then once again returns to step S700.

In contrast, in step S1900, a further determination is made whether the last swath of image data has been printed. If so, operation continues to step S1980, where operation of the method ends. Otherwise, operation continues to step S1940, where the next swath of image data is selected as the current swath. Operation then returns to step S400.

It should be appreciated that, in the method outlined above in FIGS. 9A–9B, each swath is completely printed before moving the receiving substrate relative to the printhead for printing a next swath. Of course, as illustrated in FIGS. 5A–5E, it is also possible to use the systems and methods of this invention with a partial advance scheme. In this case, after each pass, the print head advances A scanlines when the width of the printhead, in scanlines, is on the order of A*N scanlines. Then, after the random number generator generates all of the random numbers for the pixels in the "first" A scanlines, the state of the random number generator is saved at that point. Accordingly, in this case, step S600 would instead occur between a first portion of step S900 and a second portion of step S900. In this case, the "first" A scanlines are those A scanlines whose printing will be completed upon finishing the current pass. This case is further described in the flowcharts outlined in FIGS. 11A–12B.

Figure 10A:
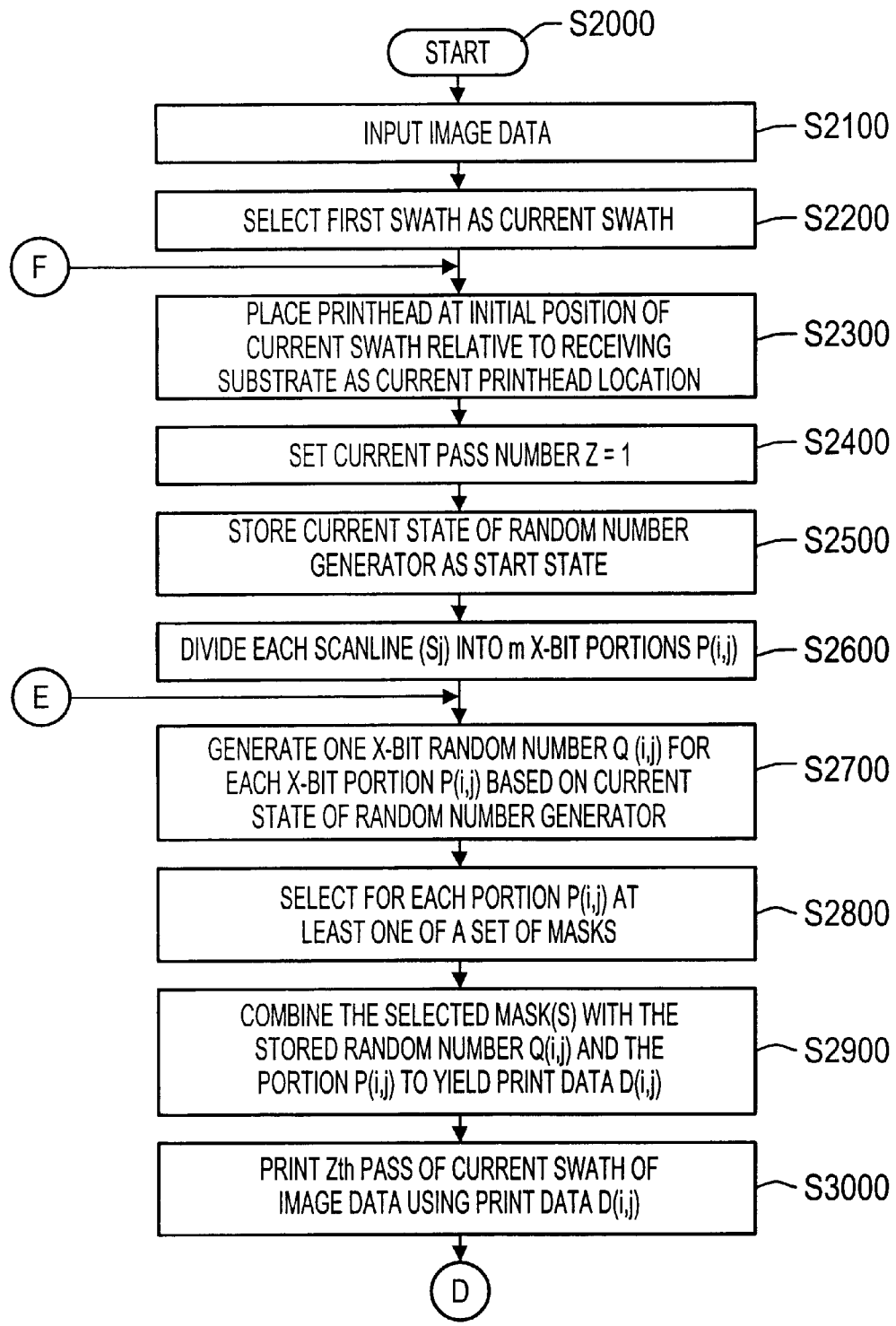
FIGS. 10A and 10B are a flowchart outlining a second exemplary embodiment of a method for random multipass fluid ejection according to this invention.
Figure 10B:
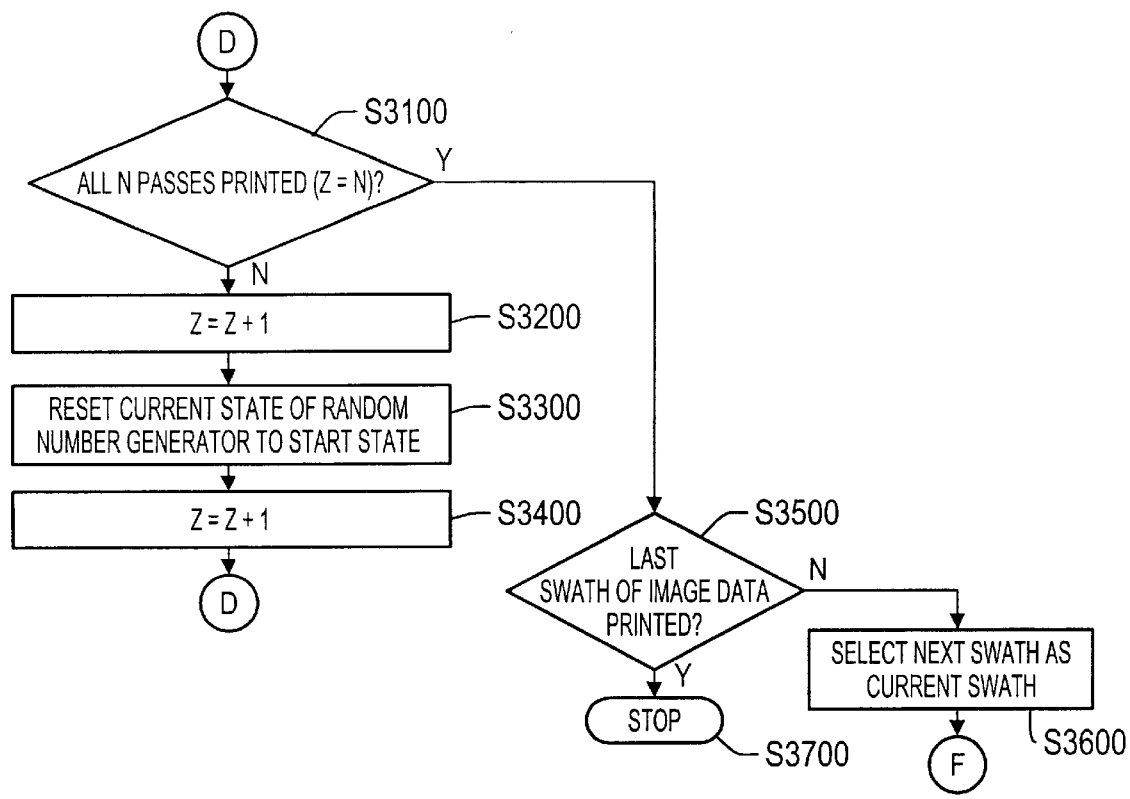

FIGS. 10A–10B are a flowchart outlining a second exemplary embodiment of a method for random multipass fluid ejection according to this invention. In the embodiment shown in FIGS. 10A–10B, each swath requires N passes to be completely printed. As shown in FIG. 10A, operation of the method begins in step S2000 and continues to step S2100, where the image data is input. Then, in step S2200, the first swath is selected as the current swath. Next, in step S2300, the print head is placed at an initial position of the current swath relative to the receiving substrate as the current print head location. Operation then continues to step S2400.

In step S2400, the current pass number Z is set equal to 1. Next, in step S2500, the current state of the random number generator is stored as the start state. Then, in step S2600, each scanline of the current swath is divided into m x-bit portions. Operation then continues to step S2700.

In step S2700, the random number generator generates one x-bit random number for each of the m x-bit portions, based on the current state of the random number, and the state of the random number generator is updated. Then, in step S2800, at least one mask of a set of masks is selected for each of the m x-bit portions. Next, in step S2900, for each of the m x-bit portions, the selected at least one mask for that portion is combined with the x-bit random number for that portion and the input image data to yield print data. Operation then continues to step S3000.

In step S3000, the Zth pass of current swath of image data is printed using the print data generated in step S2900. Then, in step S3100, a determination is made whether Z=N, i.e., whether all N passes of the current swath have been printed. If not, operation proceeds to step S3200. Otherwise, operation jumps to step S3300. In step S3200, the pass number Z is incremented by one. Next, in step S3300, the current state of the random number generator is reset to the start state. Then, in step S3400, the printhead is returned to the initial position of the current swath. Operation then returns to step S2700.

In contrast, in step S3500, a determination is made whether the last swath of image data has been printed. If not, operation continues to step S3600, where the next swath is selected as the current swath. Operation then returns to step S2300. Otherwise, operation jumps to step S3700, where operation of the method ends.

In particular, in step S2900, the x-bit portion of the image data, and the x-bit random number and the one or more x-bit masks for that x-bit portion, are combined on a bit-by-bit basis. In one exemplary embodiment, for an N-pass mode, x is 32. Thus, for each 32-bit random number q, each bit will be logically combined with one or more pass-specific masks for each of the N passes, such that each pixel of each 32-pixel portions will be enabled exactly once during the N passes.

In one exemplary embodiment of a three-pass system, for a first one of the passes, the 32-bit random number q is logically combined with a first mask $M_1$ comprising the hexidecimal number "DB6DB6DB" as a fourth mask $M_4$="q&$M_1$". The mask $M_1$, has 22 "1" bits and 10 "0" bits, and each bit in q has a 50% chance of being a 1 bit. Thus, on average, 11 of 32 pixels will be enabled. For each of the remaining two passes, half of the pixels not enabled in the first pass should be enabled. Therefore, for a second and a third one of the three passes, the 32-bit random number q is logically combined with the first mask $M_1$ and a second mask $M_2$ comprising the hexadecimal number "AAAAAAAA" as a fifth mask $M_5$="~(q&$M_1$) &$M_2$", and q is also combined with the first mask and a third mask $M_3$ comprising the hexadecimal number "55555555", as a sixth mask $M_6$="~(q&$M_1$)& $M_3$. In this case, "~" represents the logical bit-wise complement. In this way, the second and third passes each have exactly half of the pixels not enabled on the first pass enabled, and the pixels enabled on the second and third passes form mutually exclusive sets. In various exemplary embodiments, the masks $M_5$ and $M_6$ can be used alternately on even and odd scanlines, respectively, for the second pass, and on odd and even scanlines, respectively, for the third pass. Clearly, other masks could be used for equally beneficial effect; the ones described being examples only.

It should be appreciated that, in various exemplary embodiments, one of the fourth-sixth combination masks $M_4$, $M_5$ and $M_6$ will be combined with the m 32-bit portions of each of the scanlines of the current swath during one of the three passes.

Alternatively, in various other exemplary embodiments, the first combination of masks $M_4$ can be combined with the 32-bit portions of all of the scanlines of the current swath during one pass. Then, during another pass, the second combination of masks $M_5$ is combined with each of the m 32-bit portions of a first exclusive subset of the scanlines, such as the even scanlines, while the third combination of masks $M_6$ is combined with each of the m 32-bit portions of a second exclusive subset of the scanlines, such as the odd scanlines. Finally, during a last pass, the second combination of masks $M_5$ is combined with each of the m 32-bit portions of the second exclusive subset, while the third combination of masks $M_6$ is combined with each of the m 32-bit portions of the first exclusive subset.

In one exemplary embodiment of a four-pass mode, this first-second exclusive subset scheme is used to ensure that each pixel is enabled exactly once during the four passes. In this case, for these four passes, the random number q is variously logically combined with the second and third masks $M_2$ and $M_3$ as a seventh mask $M_7$="q&$M_2$", an eighth mask $M_8$"q&$M_3$", a ninth mask $M_9$="(~q) & $M_2$" and a tenth mask $M_{10}$="(~q)&$M_3$".

Then, in a first one of the passes, the first and second exclusive subsets are logically combined with the combinations of masks $M_7$ and $M_8$, respectively. Then, in a second one of the passes, the first and second exclusive subsets are combined with the other one of the combinations of masks $M_7$ and $M_8$, i.e., with the combinations of masks $M_8$ and $M_7$, respectively. Similarly, in the third and fourth ones of the passes, the first and second exclusive subsets are logically combined with the combination masks $M_9$ and $M_{10}$, respectively, and the combinations of masks $M_{10}$ and $M_9$, respectively. It should be appreciated that the first-fourth passes do not need to use the first-fourth ones of the logical combinations of masks, so long as each of the four passes uses a different one of four logical combinations of masks.

Figure 11A:
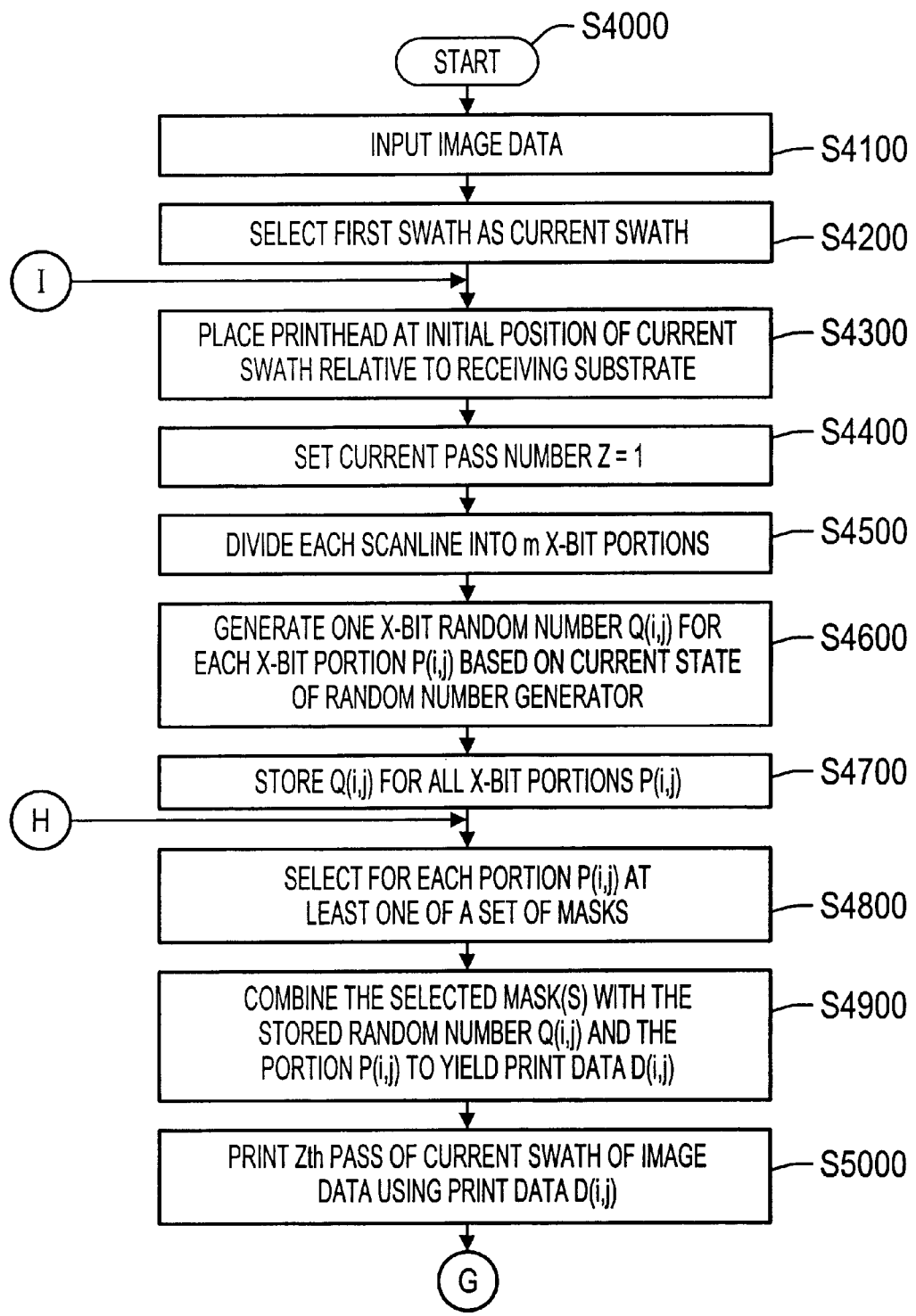
FIGS. 11A and 11B are a flowchart outlining a third exemplary embodiment of a method for random multipass fluid ejection according to this invention.
Figure 11B:
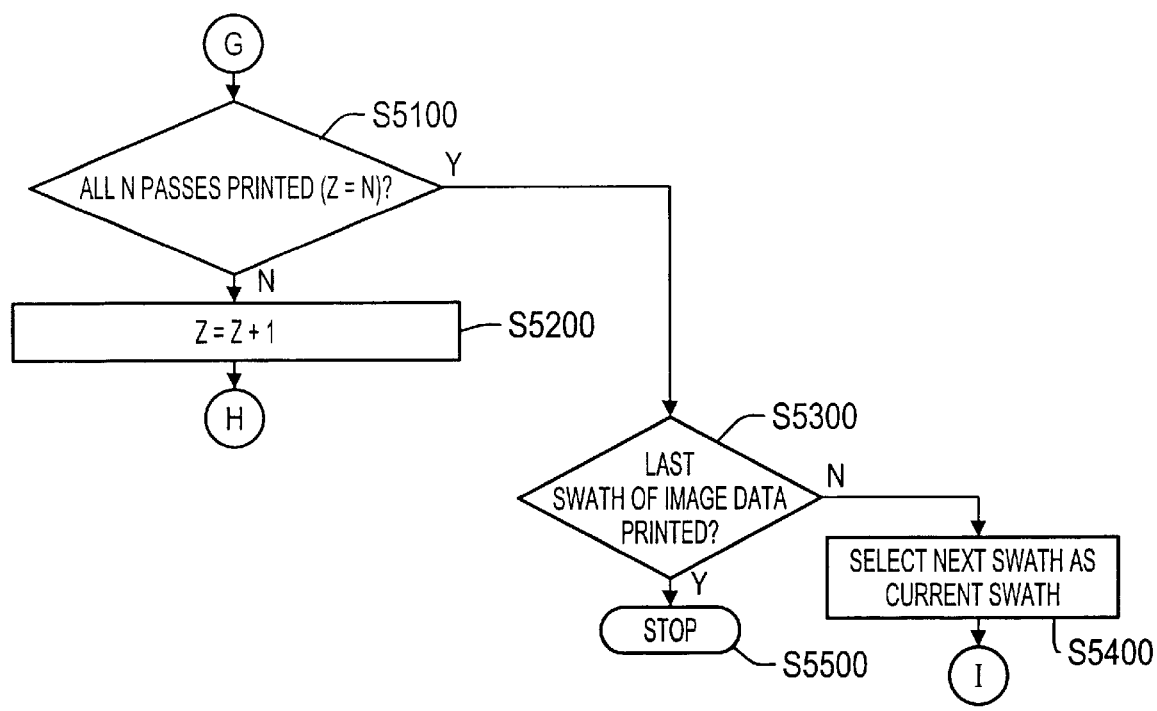

FIGS. 11A and 11B are a flowchart outlining a third exemplary embodiment of a method for random multipass fluid ejection according to this invention. As shown in FIG. 11A, operation of the method begins in step S4000 and continues to step S4100, where image data is input. Next, in step S4200, the first swath is selected as the current swath of image data. Then, in step S4300, the print head is placed at an initial position of the current swath relative to a receiving substrate. Operation then continues to step S4400.

In step S4400, the current pass number Z is set equal to 1. Next, in step S4500, each scanline is divided into m x-bit portions. Then, in step S4600, an x-bit random number $Q_{(i,j)}$ is generated for each of the m x-bit portions of the jth scanline based on the current state of the random number generator. Operation then continues to step S4700.

In step S4700, the random numbers $Q_{(ij)}$ for all of the x-bit portions P are stored in memory. Then, in step S4800, at least one mask of a set of bit masks is selected for each portion P. Next, in step S4900, the selected mask is combined with the particular random number $Q_{(ij)}$ and the input image data $P_{(ij)}$ for a given ith x-bit portion of pixels of the jth scanline to yield the print data $D_{(ij)}$ for that portion of the pixels of the image data. Then, in step S5000, the Zth pass of the current swath of image data is printed using the print data $D_{(ij)}$ for all of the m x-bit portions. Operation then continues to step S5100.

In step S5100, a determination is made whether all N passes have been printed. If not, operation continues to step S5200. Otherwise, operation jumps to step S5300. In step S5200, the current pass number Z is incremented by 1. Operation then returns to step S4100. In contrast, in step S5300, a determination is made whether the last swath of image data has been printed. If not, operation continues to step S5400. Otherwise, operation jumps to step S5500. In step S5400, the next swath is selected as the current swath. Operation then returns to step S4300. In contrast, in step S5500, operation of the method ends.

It should be appreciated that, for various other exemplary embodiments, in the method outlined in FIGS. 11A and 11B, rather than saving the start state of the random number generator, the actual random numbers themselves are saved. This essentially trades computational speed and simplicity for memory. Thus, in these exemplary embodiments, this method is faster, as the random numbers do not need to be regenerated, but can require significant memory resources to store all of the random numbers for a current swath. It should also be appreciated that this can be used with any of the previously-described methods.

It should also be appreciated that, in these exemplary embodiments, so long as the data structure of the stored random numbers indicates which pixel, or set of x pixels, a particular random number is associated with, the printhead does not need to be returned to an initial position of the swath for a next pass. That is, in the other embodiments, the printhead must be returned to the initial position so that, when the random numbers are regenerated in a specific order, the same random number is associated with the same pixel or set of x pixels for each pass. In this case, since the random numbers are stored rather than regenerated, the random numbers can be read from memory in a different order than the order these random numbers were stored in. Thus, in this case, for example, bi-directional printing can be used for a further increase in printing speed.

Figure 12A:
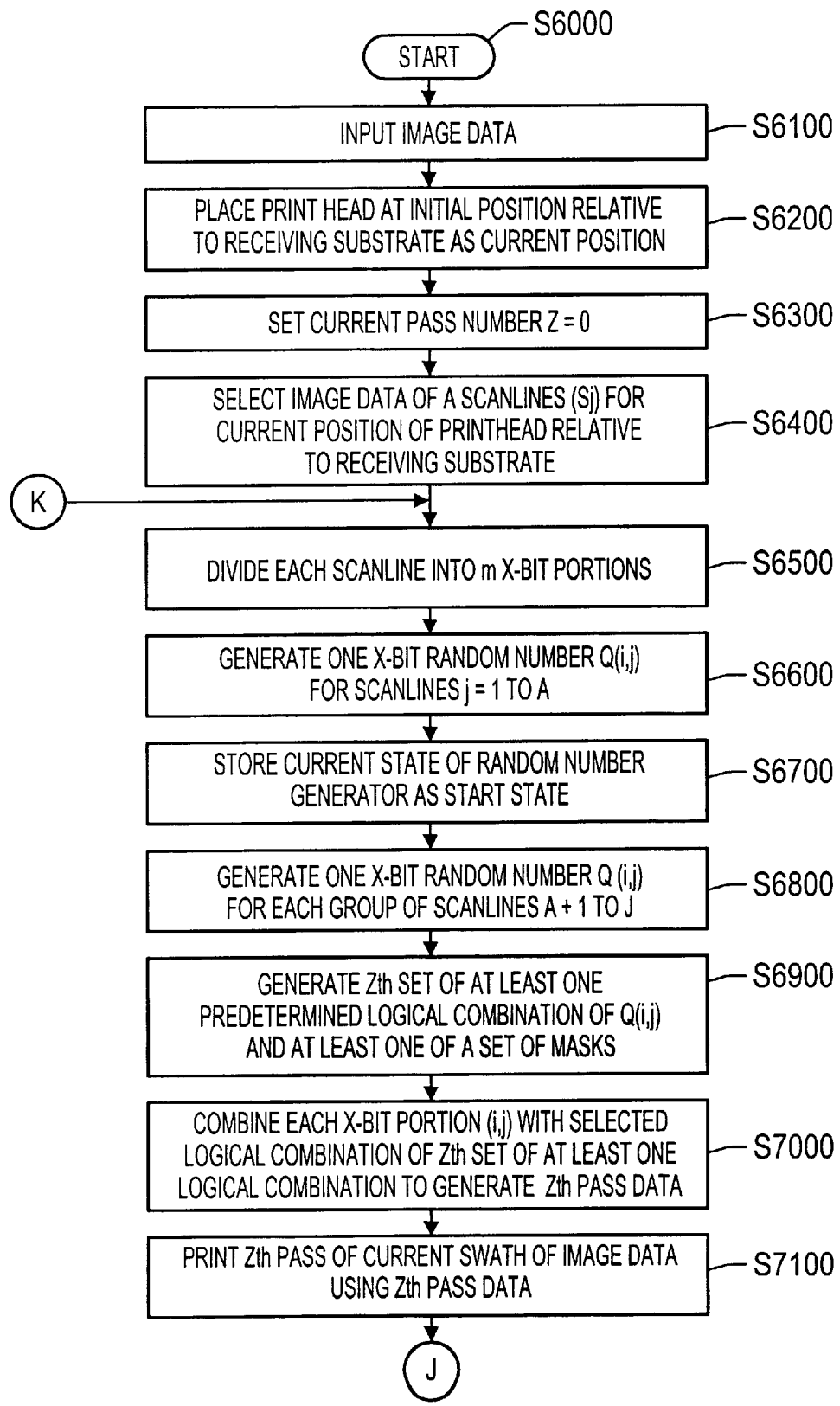
FIGS. 12A and 12B are a flowchart outlining a fourth exemplary embodiment of a method for random multipass fluid ejection according to this invention.
Figure 12B:
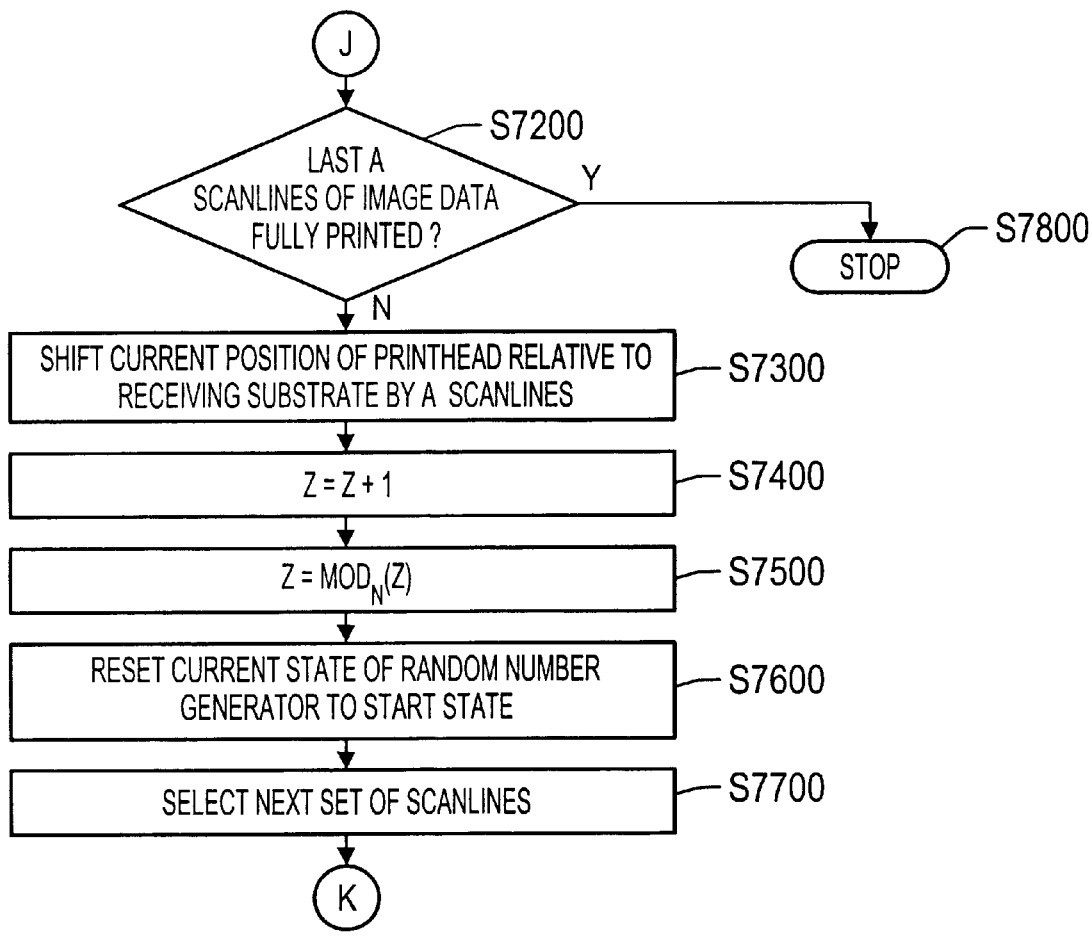

FIGS. 12A and 12B are a flowchart outlining a fourth exemplary embodiment of a method for random multipass fluid ejection according to this invention. As shown in FIG. 12A, operation of the method begins in step S6000, and continues to step S6100, where image data is input. Then, in step S6200, the print head is placed at an initial position relative to the receiving substrate as the current position. Next, in step S6300, the current pass number is set equal to 0. Then, in step S6400, image data of J scanlines for the current position of the print head relative to the receiving substrate is selected. Operation then continues to step S6500.

In step S6500, each scanline is divided into m x-bit portions. Then, in step S6600, one x-bit random number Q is generated for each x-bit portion $P_{(ij)}$ where, in this case, j ranges from 1 to A. Next, in step S6700, upon generating the random numbers $Q_{(ij)}$ for the first A scanlines, the state of the random number generator is stored as the start state. Then, in step S6800, one x-bit random number Q is generated for each of the m x-bit portions $P_{(ij)}$ for each of the remaining scanlines A+1 to J. Operation then continues to step S6900.

In step S6900, at least one mask of a set of masks is selected and is combined with the random numbers $Q_{(ij)}$. Then, in step S7000, each x-bit portion of the image data is combined with the selected at least one mask and the associated random number $Q_{(ij)}$ to generate the Zth pass data $D_{(ij)}$, as outlined above. Then, in step S7100, the Zth pass data $D_{(ij)}$ for the current swath of J scanlines of the image data is printed. Operation then continues to step S7200.

In step S7200, a determination will be made whether the last set of A scanlines of the image data has been fully printed. If so, operation jumps to step S7700. Otherwise, operation continues to step S7300, where the current position of the print head relative to the receiving substrate is shifted by A scanlines. Next, in step S7400, the pass number Z is incremented by one. Then, in step S7500, $Z=mod_N Z$, i.e., the N modulo of the pass number Z is taken and stored as Z. That is, the value of the current pass number Z is limited to the modulus of the number of passes N it takes to complete each set of A scanlines. Thus, for an N-pass system, Z ranges from zero to N−1, after which Z is reset to zero by the modulo operation. Next, in step S7600, the current state of the random number is reset to the start state. Operation then returns to step S6500. In contrast, in step S7700, operation of the method ends.

Figure 13A:
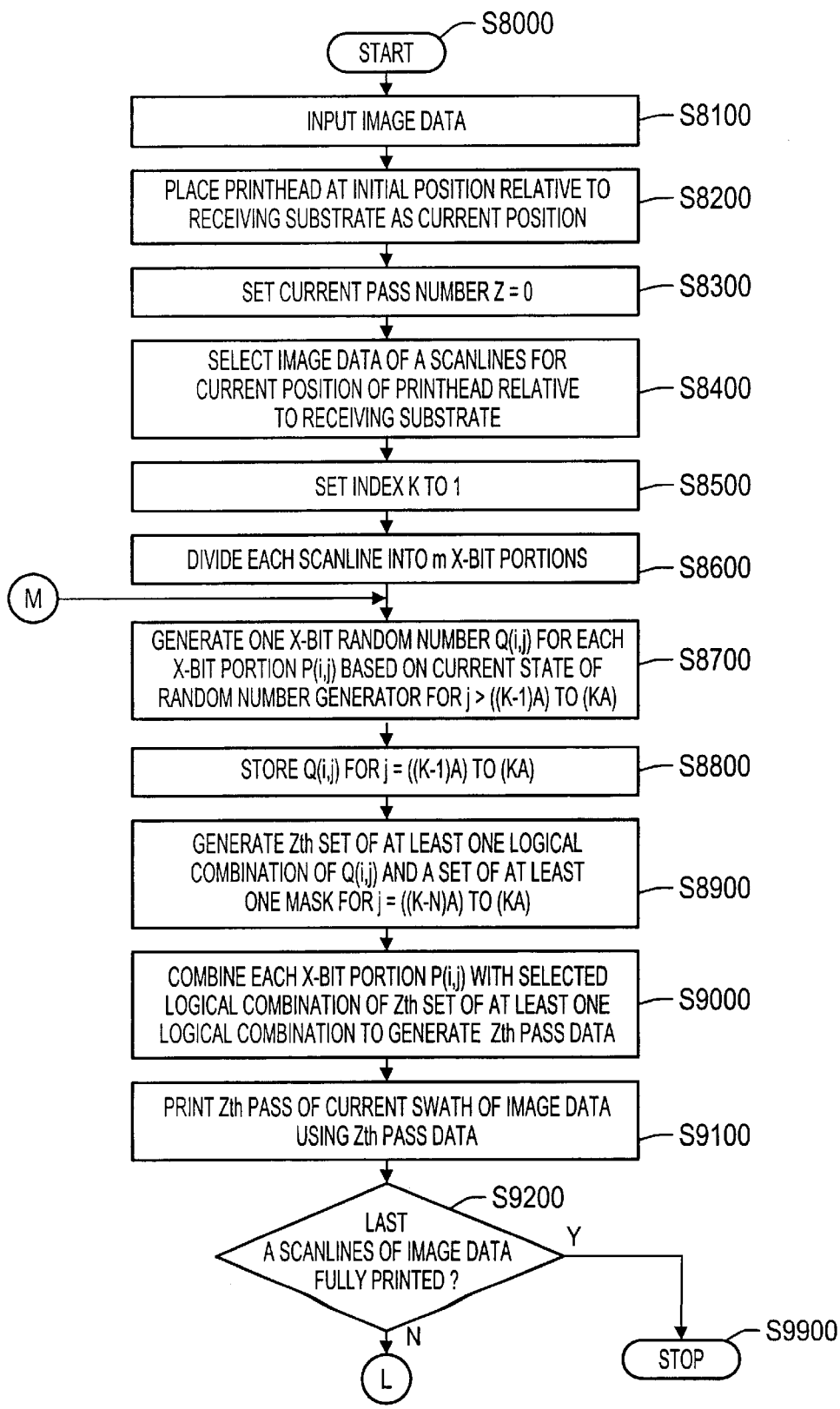
FIGS. 13A and 13B are a flowchart outlining a fifth exemplary embodiment of a method for random multipass fluid ejection according to this invention.
Figure 13B:
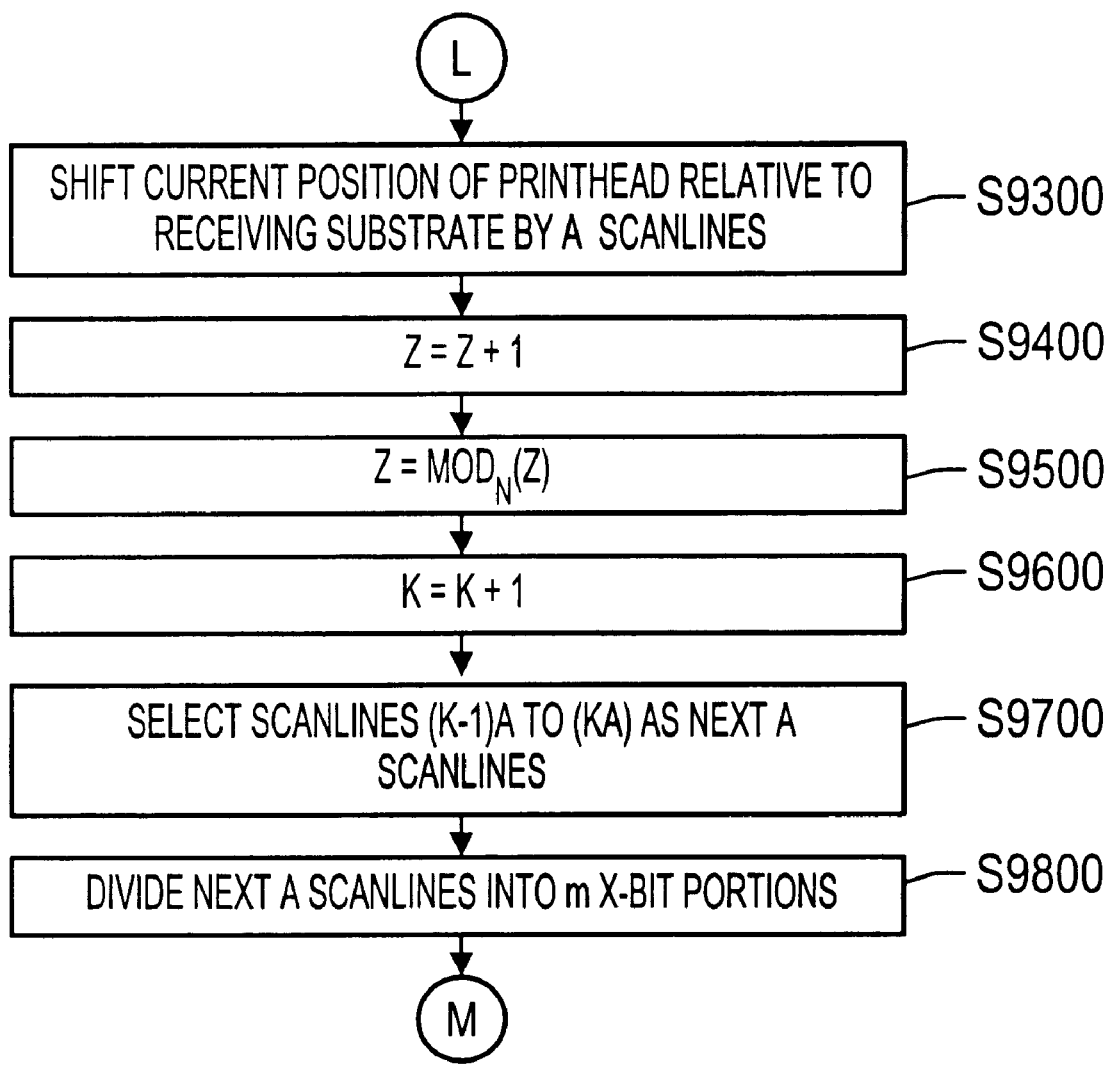

FIGS. 13A and 13B are a flowchart outlining a fifth exemplary embodiment of a method for random multipass fluid ejection according to this invention. As shown in FIG. 13A, operation of the method begins in step S8000 and continues to step S8100, where image data is input. Then, in step S8200, the print head is placed at an initial position relative to the receiving substrate as the current position. Next, in step S8300, the current pass number Z is set equal to 0. Operation then continues to step S8400.

In step S8400, the image data of A scanlines for the current position of the print head relative to the receiving substrate is selected. Next, in step S8500, an index value K is set equal to 1. Then, in step S8600, each of the A scanlines is divided into m x-bit portions. Operation then continues to step S8700.

In step S8700, one x-bit random number Q is generated for each of the m x-bit portions P based on the current state of the random number generator. Then, in step S8800, the random numbers $Q_{(ij)}$, for i=1 to m and for j=(K−N)A to KA, are stored into memory. Next, in step S8900, a Zth mask is selected from a set of predetermined masks for a particular x-bit portion $P_{(ij)}$ of the image data. Operation then continues to step S9000.

In step S9000, the selected masks are combined with the random numbers $Q_{(ij)}$ and the input image data portion $P_{(ij)}$ to yield the print data $D_{(ij)}$ for each x-bit portion. Next, in step S9100, the Zth pass for the current swath of the image data P is printed. Then, in step S9200, a determination is made whether the last A scanlines of the image data were fully printed. If so, operation jumps to step S9900, where operation of the method ends. Otherwise, the operation proceeds to step S9300.

In step S9300, the current position of the print head is shifted relative to the receiving substrate by A scanlines. Then, in step S9400, the current pass number Z is incremented by one. Next, Z is reset to modN Z, as outlined above with respect to step S7500 of FIG. 12B. Operation then continues to step S9600.

In step S9600, the index value K is increased by 1. Next, in step S9700, the K−1)A to KA scanlines are selected as the next scanlines A and are added to the scanlines (K−N)A to (K−−1)A to form the next swath of scanlines. Then, in step S9800, the next scanlines A are divided into m x-bit portions. Operation then returns to step S8700.

The above methods of operation may be applied in any number of applications other than the applications specifically described above. The method for random multipass fluid injection may be dependent upon the particular application, including a particular hardware configuration. Furthermore, many special processing routines may be, for example, combined to provide greater versatility in the processing of the information and creation of a high quality printed pattern.

While this invention has been described with specific embodiments thereof, it is evident then many alternatives, modifications and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for randomly multipass printing a set of scanlines, comprising:

inputting image data corresponding to the set of scanlines;

dividing each scanline into a plurality of portions of pixels, each portion comprising at least one pixel;

storing a start state for generating random numbers;

generating a random number for each portion of pixels of the set of scanlines;

determining, for each pixel of the set of scanlines, whether that pixel is enabled for a current one of a number N of passes of printing of the set of scanlines based on the random number generated for that pixel;

printing the current pass of the set of scanlines based on the enabled pixels and image data associated with the enabled pixels; and repeating, until the set of scanlines is fully printed, the generating, determining and printing steps for each subsequent one of the number N of passes of printing of the image data of the set of scanlines based on the saved start state for generating random numbers.

2. The method of claim 1, wherein dividing each scanline into a plurality of portions of pixels comprises dividing each scanline of b pixels into b portions of one pixel each.

3. The method of claim 2, wherein:

generating the random number for each portion comprises generating a random number Q for each pixel, the random number having a range R; and determining, for each pixel, whether that pixel is enabled for the current pass comprises determining whether that pixel is enabled for the current pass based on a relationship between the random number Q for that pixel and the range R.

4. The method of claim 3, wherein, when the number of passes N is two, the relationship between the random number Q for that pixel and the range is whether $Q \leq R/2$ for a first pass and whether $Q > R/2$ for a second pass.

5. The method of claim 3, wherein the relationship between the random number Q for that pixel and the range, for a Zth pass, $0 \leq Z \leq N-1$, is $Z = \lfloor QN/R \rfloor$.

6. The method of claim 1, wherein dividing each scanline into a plurality of portions of pixels comprises dividing each scanline of b pixels into m portions of q pixels each.

7. The method of claim 6, wherein:

generating the random number for each portion comprises generating a q-bit random number Q for each of the m portions of q pixels, the random number having a range $R=2^q$, such that, for each portion, each pixel of that portion is associated with one of the q bits of the random number Q generated for that portion; and determining, for each pixel, whether that pixel is enabled for the current pass comprises generating a logical combination of the bit of the random number for that pixel and bits corresponding to that pixel of zero, one or more masks corresponding to the current pass.

8. The method of claim 7, wherein generating the logical combination of the bit of the random number for that pixel and bits corresponding to that pixel of zero, one or more masks corresponding to the current pass comprises taking the complement of the bit of the random number for that pixel.

9. The method of claim 7, wherein generating the logical combination of the bit of the random number for that pixel and bits corresponding to that pixel of zero, one or more masks corresponding to the current pass comprises logically combining the bit of the random number for that pixel with the bit corresponding to that pixel of at least one mask corresponding to the current pass.

10. A method for randomly multipass printing an image using a printhead having a printing region that is able to print A scanlines during a pass, the printing region passing over each scanline N times, the method comprising:

inputting image data corresponding to the image, the image data comprising a plurality of scanlines;

dividing each scanline into a plurality of portions of pixels, each portion comprising at least one pixel;

selecting a set of scanlines to be printed during a current pass of the printhead, where the selected set of scanlines is less than A;

combining the selected set of scanlines to be printed with at most (N−1) previously-selected sets of scanlines to form a current swath of at most A scanlines to be printed during the current pass;

generating a random number for each portion of pixels of the current swath based on a start state for generating the random numbers;

storing, after generating random numbers for an initial one of the sets of scanlines combined to form the current swath, a current state for generating the random numbers as the start state for generating the random numbers;

determining, for each pixel of the current swath, whether that pixel is enabled for the current pass based on the random number generated for that pixel; and printing the current swath of at most A scanlines during the current pass based on the enabled pixels and image data associated with the enabled pixels.

11. The method of claim 10, further comprising repeating the selecting, combining, generating, storing, determining and printing steps for each subsequent set of scanlines based on the stored start state for generating random numbers.

12. The method of claim 10, further comprising, after the selecting, combining, generating, storing, determining and printing steps have been performed for a last set of scanlines of the image, repeating the selecting, combining, generating, storing, determining and printing steps for at most N−1 sets of null-data scanlines as additional sets of scanlines to be printed until the image is fully printed.

13. The method of claim 10, wherein dividing each scanline into a plurality of portions of pixels comprises dividing each scanline of b pixels into b portions of one pixel each.

14. The method of claim 10, wherein:

generating the random number for each portion comprises generating a random number Q for each pixel, the random number having a range R; and determining, for each pixel, whether that pixel is enabled for the current pass comprises determining whether that pixel is enabled for the current pass based on a relationship between the random number Q for that pixel and the range R.

15. The method of claim 14, wherein, when the number of passes N is two, the relationship between the random number Q for that pixel and the range is whether $Q \leq R/2$ for a first pass and whether $Q > R/2$ for a second pass.

16. The method of claim 14, wherein the relationship between the random number Q for that pixel and the range, for a Zth pass, $0 \leq Z \leq N-1$, is $Z = \lfloor QN/R \rfloor$.

17. The method of claim 10, wherein dividing each scanline into a plurality of portions of pixels comprises dividing each scanline of b pixels into m portions of q pixels each.

18. The method of claim 17, wherein:

generating the random number for each portion comprises generating a q-bit random number Q for each of the m portions of q pixels, the random number having a range $R=2^q$, such that, for each portion, each pixel of that portion is associated with one of the q bits of the random number Q generated for that portion; and determining, for each pixel, whether that pixel is enabled for the current pass comprises generating a logical combination of the bit of the random number for that pixel and bits corresponding to that pixel of zero, one or more masks corresponding to the current pass.

19. The method of claim 18, wherein generating the logical combination of the bit of the random number for that pixel and bits corresponding to that pixel of zero, one or more masks corresponding to the current pass comprises taking the complement of the bit of the random number for that pixel.

20. The method of claim 18, wherein generating the logical combination of the bit of the random number for that pixel and bits corresponding to that pixel of zero, one or more masks corresponding to the current pass comprises logically combining the complement of the bit of the random number for that pixel with the bit corresponding to that pixel of at least one mask corresponding to the current pass.

21. A method for randomly multipass printing a set of scanlines, comprising:

inputting image data corresponding to the set of scanlines;

dividing each scanline into a plurality of portions of pixels, each portion comprising at least one pixel;

generating and storing a random number for each portion of pixels of the set of scanlines;

determining, for each pixel of the set of scanlines, whether that pixel is enabled for a current one of a number N of passes of printing of the set of scanlines based on the stored random number corresponding to that pixel;

printing the current pass of the set of scanlines based on the enabled pixels and image data associated with the enabled pixels; and repeating, until the set of scanlines is fully printed, the determining and printing steps for each subsequent one of the number N of passes of printing of the image data of the set of scanlines based on the stored random numbers.

22. The method of claim 21, wherein dividing each scanline into a plurality of portions of pixels comprises dividing each scanline of b pixels into b portions of one pixel each.

23. The method of claim 22, wherein:

generating the random number for each portion comprises generating a random number Q for each pixel, the random number having a range R; and determining, for each pixel, whether that pixel is enabled for the current pass comprises determining whether that pixel is enabled for the current pass based on a relationship between the random number Q for that pixel and the range R.

24. The method of claim 23, wherein, when the number of passes N is two, the relationship between the random number Q for that pixel and the range is whether $Q \leq R/2$ for a first pass and whether $Q > R/2$ for a second pass.

25. The method of claim 23, wherein the relationship between the random number Q for that pixel and the range, for a Zth pass, $0 \leq Z \leq N-1$, is $Z = \lfloor QN/R \rfloor$.

26. The method of claim 23, wherein dividing each scanline into a plurality of portions of pixels comprises dividing each scanline of b pixels into m portions of q pixels each.

27. The method of claim 26, wherein:

generating the random number for each portion comprises generating a q-bit random number Q for each of the m portions of q pixels, the random number having a range $R = 2^q$, such that, for each portion, each pixel of that portion is associated with one of the q bits of the random number Q generated for that portion; and determining, for each pixel, whether that pixel is enabled for the current pass comprises generating a logical combination of the bit of the random number for that pixel and bits corresponding to that pixel of zero, one or more masks corresponding to the current pass.

28. The method of claim 27, wherein generating the logical combination of the bit of the random number for that pixel and bits corresponding to that pixel of zero, one or more masks corresponding to the current pass comprises taking the complement of the bit of the random number for that pixel.

29. The method of claim 27, wherein generating the logical combination of the bit of the random number for that pixel and bits corresponding to that pixel of zero, one or more masks corresponding to the current pass comprises logically combining the complement of the bit of the random number for that pixel with the bit corresponding to that pixel of at least one mask corresponding to the current pass.

30. A method for randomly multipass printing an image using a printhead having a printing region that is able to print A scanlines of the image during a pass, the printing region passing over each scanline N times, the method comprising:

inputting image data corresponding to the image, the image data comprising a plurality of scanlines;

dividing each scanline into a plurality of portions of pixels, each portion comprising at least one pixel;

selecting a set of scanlines to be printed during a current pass of the printhead, where the selected set of scanlines is less than A;

generating and storing a random number for each portion of pixels of the selected set of scanlines;

combining the selected set of scanlines to be printed with at most (N−1) previously-selected sets of scanlines to form a current swath of at most A scanlines to be printed during the current pass;

determining, for each pixel of the current swath, whether that pixel is enabled for the current pass based on the stored random number corresponding to that pixel; and printing the current swath of at most A scanlines during the current pass based on the enabled pixels and image data associated with the enabled pixels.

31. The method of claim 30, further comprising repeating the selecting, generating and storing, combining, determining and printing steps for each subsequent set of scanlines.

32. The method of claim 30, further comprising, after the selecting, generating and storing, combining, determining and printing steps have been performed for a last set of scanlines of the image, repeating the selecting, combining, determining and printing steps for at most N−1 sets of null-data scanlines as additional sets of scanlines to be printed until the image is fully printed.

33. The method of claim 30, wherein dividing each scanline into a plurality of portions of pixels comprises dividing each scanline of b pixels into b portions of one pixel each.

34. The method of claim 30, wherein:

generating the random number for each portion comprises generating a random number Q for each pixel, the random number having a range R; and determining, for each pixel, whether that pixel is enabled for the current pass comprises determining whether that pixel is enabled for the current pass based on a relationship between the random number Q for that pixel and the range R.

35. The method of claim 34, wherein, when the number of passes N is two, the relationship between the random number Q for that pixel and the range is whether $Q \leq R/2$ for a first pass and whether $Q > R/2$ for a second pass.

36. The method of claim 34, wherein the relationship between the random number Q for that pixel and the range, for a Zth pass, $0 \leq Z \leq N-1$, is $Z=\lfloor QN/R \rfloor$.

37. The method of claim 30, wherein dividing each scanline into a plurality of portions of pixels comprises dividing each scanline of b pixels into m portions of q pixels each.

38. The method of claim 37, wherein:

generating the random number for each portion comprises generating a q-bit random number Q for each of the m portions of q pixels, the random number having a range $R=2^q$, such that, for each portion, each pixel of that portion is associated with one of the q bits of the random number Q generated for that portion; and determining, for each pixel, whether that pixel is enabled for the current pass comprises generating a logical combination of the bit of the random number for that pixel and bits corresponding to that pixel of zero, one or more masks corresponding to the current pass.

39. The method of claim 38, wherein generating the logical combination of the bit of the random number for that pixel and bits corresponding to that pixel of zero, one or more masks corresponding to the current pass comprises taking the complement of the bit of the random number for that pixel.

40. The method of claim 38, wherein generating the logical combination of the bit of the random number for that pixel and bits corresponding to that pixel of zero, one or more masks corresponding to the current pass comprises logically combining the complement of the bit of the random number for that pixel with the bit corresponding to that pixel of at least one mask corresponding to the current pass.

* * * * *